US008164419B2

(12) United States Patent
Fisher

(10) Patent No.: US 8,164,419 B2
(45) **Date of Patent: *Apr. 24, 2012**

(54) ELECTRONIC LOCK BOX WITH TIME-RELATED DATA ENCRYPTION BASED ON USER-SELECTED PIN

(75) Inventor: Scott R. Fisher, Cincinnati, OH (US)

(73) Assignee: SentriLock, LLC, Cincinnati, OH (US)

( * ) Notice: Subject to any disclaimer, the term of this patent is extended or adjusted under 35 U.S.C. 154(b) by 178 days.

This patent is subject to a terminal disclaimer.

(21) Appl. No.: 12/199,081

(22) Filed: Aug. 27, 2008

(65) Prior Publication Data

US 2008/0309458 A1 Dec. 18, 2008

Related U.S. Application Data

(63) Continuation of application No. 10/805,018, filed on Mar. 19, 2004, now Pat. No. 7,420,456.

(51) Int. Cl.
*H04L 9/32* (2006.01)

(52) U.S. Cl. ...................................................... 340/5.73

(58) Field of Classification Search ................. 340/5.73, 340/5.1, 5.2, 5.6, 5.8, 5.51, 5.21, 5.22, 5.3; 70/278; 713/172, 182, 186

See application file for complete search history.

(56) References Cited

U.S. PATENT DOCUMENTS

| | | | | |
|---|---|---|---|---|
| 4,609,780 | A | 9/1986 | Clark | |
| 4,988,987 | A | 1/1991 | Barrett et al. | |
| 4,993,068 | A * | 2/1991 | Piosenka et al. | 713/186 |
| 5,046,084 | A | 9/1991 | Barrett et al. | |
| 5,397,884 | A | 3/1995 | Saliga | |
| 5,475,375 | A | 12/1995 | Barrett et al. | |
| 5,815,557 | A | 9/1998 | Larson | |
| 5,932,264 | A | 8/1999 | Hurd et al. | |
| 6,072,402 | A | 6/2000 | Kniffin et al. | |
| 6,300,873 | B1 | 10/2001 | Kucharczyk et al. | |
| 6,714,118 | B1 | 3/2004 | Frolov et al. | |
| 6,822,553 | B1 | 11/2004 | Henderson et al. | |
| 2001/0050615 | A1 | 12/2001 | Kucharczyk et al. | |
| 2003/0179075 | A1 | 9/2003 | Greenman | |
| 2004/0025039 | A1 | 2/2004 | Kuenzi et al. | |

FOREIGN PATENT DOCUMENTS

| | | | |
|---|---|---|---|
| EP | 1410346 | B1 | 9/2006 |

* cited by examiner

*Primary Examiner* — Nabil Syed
(74) *Attorney, Agent, or Firm* — Frederick H. Gribbell

(57) ABSTRACT

An electronic lock box contains a secure compartment for storing keys to a structure. A linear actuator moves in one direction opening the door to the secure compartment, and moves in the opposite direction releasing a shackle that holds the lock box to the structure. A lock box system uses an encryption algorithm to diversify user PIN data at a central computer, and stores that diversified information on a memory card for later use when the user attempts to access a lock box. The central computer and electronic lock box both keep track of system "epoch time," and the memory card must be presented to the electronic lock box within a correct epoch time window for the diversified PIN data to be successfully decrypted and compared to the user's PIN data that is entered on a keypad of the electronic lock box.

12 Claims, 22 Drawing Sheets

Cryptographic Card Expiration

Cryptographic Card Expiration

ELECTRONIC LOCK BOX WITH TIME-RELATED DATA ENCRYPTION BASED ON USER-SELECTED PIN

CROSS-REFERENCE TO RELATED APPLICATIONS

The present application is a continuation of application Ser. No. 10/805,018, titled "ELECTRONIC LOCK BOX WITH MULTIPLE MODES AND SECURITY STATES," filed on Mar. 19, 2004, soon to be U.S. Pat. No. 7,420,456.

TECHNICAL FIELD

The present invention relates generally to electronic lock equipment and is particularly directed to an electronic lock box of the type that contains a secure compartment for storing keys that allow entry to a structure. The invention is specifically disclosed as an electronic lock box that includes an internal linear actuator that moves in one direction to open the door to a secure compartment containing a key to the structure, and moves in the opposite direction to release a shackle that holds the lock box to the structure, such as a door handle.

The invention is also directed to an electronic lock box system that uses an encryption algorithm to diversify user PIN data at a central computer, and store that diversified information on a memory card for later use when the user attempts to access a particular lock box. The central computer and the electronic lock box both have time counters that keep track of system "epoch time," and the memory card must be presented to the electronic lock box within a correct epoch time window for the diversified PIN data to be successfully decrypted and compared to the user's PIN data that is also entered on a keypad of the electronic lock box. The invention is specifically disclosed as using pseudo-random cryptographic key generator to seed the electronic lock box system to a known equivalent state (at a specific "real time") at both the central computer and for the individual electronic lock boxes. The key is kept secret from the human users, and only the computers have knowledge of its value; the key is then changed in lockstep by the system's computers as epoch time passes.

The invention further provides multiple modes of operation, and more than one level of security. In a higher security state, the electronic lock box will require a memory card/smart card to be presented at a card reader port before accepting any commands to perform a function. In a lower security state (a "contractor mode" of operation), the electronic lock box will accept a manual code entry without a memory card/smart card being used. The manual code entry will contain more than one piece of information, and will provide identification information of the person accessing the key compartment of the electronic lock box. This identification information will be logged and stored in the electronic lock box's memory.

BACKGROUND OF THE INVENTION

In the real estate industry, a need exists for controlled access to homes for sale that is both flexible to serve the real estate professional and secure for the homeowner's peace of mind. The traditional method has been the use of a key safe or lock box that attaches to the homeowner's doorknob and contains the dwelling key. Many conventional designs ranging from mechanical to electronic have been used over the years to provide this functionality. Homeowners prefer electronic systems because, unlike their mechanical counterparts, the electronic systems offer greater security and control over whom has access to the dwelling key and further offers the ability to track accesses to the key.

One challenge in previous designs has been the management and updating of electronic keys and electronic lock boxes with current access code information. The distribution of such information is compounded geometrically with the number of lock boxes and keys. This has not been a huge problem from the "key side" with the advent of central computer systems communicating with electronic keys; however, conventional systems now in use have not addressed the fundamental problem of updating lock box devices that are dispersed over a large geographic area. The previous designs and prior art patent literature provide an updating function via a radio signal or a pager; however, these systems are impractical due to the receiving circuit's power drain and potential proximity constraints with respect to the physical locations of receiver and transmitter.

Moreover, the convention electronic lock box systems have focused on loading electronic keys with access codes for use with lock boxes that could potentially be visited. In fact, these prior art systems have increasingly encompassed more costly and cumbersome electronic key solutions that are required to be periodically updated with new access codes.

Even with the more costly electronic key systems presently available, some convention card-based lock access control systems can be defeated by modifying the expiration data. Such electronic key systems have been in use for a number of years, particularly in the real estate industry. One example of such a design is disclosed in U.S. Pat. No. 4,988,987 (by Barrett et al.) which uses an expiration date in an electronic key and a calendar means in an electronic lockbox to enforce the actual expiration of an electronic key used by a real estate agent. The Barrett system compares the electronic key's transmitted expiration date with the calendar date contained in the electronic lock box.

It is known that such simple controls can be thwarted by an unscrupulous user by simply modifying the expiration data to a later date, thus eliminating the supposed benefit of an expiring right of access to a lockbox of Barrett's design, for example. Moreover, the expiration dates for some electronic key designs can be modified to create "immortal" keys, thereby potentially creating a "permanent" security hazard.

Convention lock box designs of course incorporate mechanical and electrical components that perform the functions of locking or releasing the door to a key compartment, and of locking or releasing the shackle that holds the lock box to a doorknob. There are occasions when the electromechanical components may become physically jammed, or perhaps frozen in place. If that has occurred and the lock box is actuated by a user, then the electric motor will not be able to move the mechanical unlatching components, and will endure "locked rotor" current. An overcurrent protective system has proved useful due to the relatively high current of the motor in this circumstance. Conventional lock box designs mainly have focused on utilizing motor overcurrent protection via additional current sensing electronics, or by use of self-resetting fuses that activate when the motor's stall current creates enough heat to open a motor "heater" (i.e., an overcurrent protection thermal switch). However, these conventional designs increase parts count and add complexity to their design.

It would be an improvement to provide a new method of access control of lock boxes using a simple to operate and manage system, using a new approach to the problem of access code synchronization between lock boxes and keys. Another improvement would be to provide a diversified numeric code transfer device that replaces conventional electronic keys, in which the diversified numeric code transfer device comprises a credit-card sized portable computer and a very thin secure memory card for a real estate agent for obtaining access to a lock box key compartment, in which the diversified numeric code represents a combination of the passage of time and a user's ID number. A further improvement would be to provide an electronic lock box that has a simplified mechanical construction for controlling access to a key compartment, and for controlling the release of the lock box from a fixed object, such as the door knob of a dwelling. Yet another improvement would be to detect a jammed or frozen mechanical component, and then prevent the motor from overheating by a system that does not require expensive overcurrent protection components (such as circuit breakers or thermal overload heaters).

SUMMARY OF THE INVENTION

Accordingly, it is an advantage of the present invention to provide an electronic lock box system used in real estate sales systems in which the user carries only a credit card-sized portable memory card, and in which the user receives a diversified numeric value from a central "clearinghouse computer," or from a regional "office computer," in which the diversified value represents a combination of the epoch time and the user's personal identification number (PIN), when run through an encryption routine. The diversified numeric value periodically changes over time using an algorithm known both to the lock box and to the clearinghouse computer, in which system "epoch time" is divided into time intervals ("window intervals" or "window interval periods") that, when advanced to the next window interval, change the result obtained by decrypting the diversified numeric value. The diversified numeric data resident on the portable memory card is directly transferred to the lock box computer, and this diversified numeric data is then decrypted by the lock box's computer. To allow access to the key compartment (or to unlock the shackle in some circumstances), the user must manually enter the correct ID information on a keypad of the lock box, which in many cases is the user's PIN.

It is another advantage of the present invention to provide an electronic lock box system used in real estate sales systems which operates in a "contractor mode" having a somewhat lesser security state, so that a contractor is provided with a numeric ID code that can be entered on a keypad of an electronic lock box to obtain access to a secure compartment within the lock box, without the need for a memory card. However, the numeric code is only valid for a predetermined time interval. The "owner" of the lock box provides instructions to the lock box to enable this contractor mode. A central clearinghouse computer can be used to generate more than one such contractor mode code for the same time interval (e.g., one day), and the lock box owner uses that information to set up the corresponding lock box, and to inform the one or more contractors as to their correct numeric ID codes to be used during the appropriate time interval.

It is yet another advantage of the present invention to provide an electronic lock box apparatus that includes a mechanical attachment device (e.g., a shackle) and a secure compartment with a controlled access member (e.g., a key compartment with a hinged door), in which a single linear actuator is movable in two different directions to either release the shackle or to open the key compartment door.

It is still another advantage of the present invention to provide an electronic lock box apparatus that includes a mechanical attachment device (e.g., a shackle) and a secure compartment with a controlled access member (e.g., a key compartment with a hinged door), in which there are latching members that either (1) hold the shackle or key compartment door in place, or (2) release those components from being held in place. A single linear actuator moves to operate these respective latching members, such that movement of the actuator in opposite directions releases either one or the other of these latching members. Once released, the shackle or the key compartment door can later be moved back into their respective "latched" positions and, without further movement by the linear actuator, will become locked in their "held" positions.

It is a further advantage of the present invention to provide an electronic lock box apparatus that includes a way of preventing damage to the electromechanical components when a movable part becomes jammed or frozen, without the use of extra overcurrent protection devices that perform no other function.

It is a yet further advantage of the present invention to provide an electronic lock box apparatus that is designed so that it is impossible for its card expiring access codes to be altered in order to extend the card's life, and thus prevents "immortal keys" from existing. Each memory card/smart card used with the invention's lock box design must be periodically renewed with an encoded value that does not have a predictable pattern from one time window to the next. Therefore, access rights for every card will expire after predetermined time window has passed.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, an electronic lock box apparatus having a holding member attachable to a fixed object, which comprises: an electrical power source, a controller circuit, a secure compartment having an access member actuated by a first movable latch member, a holding member actuated by a second movable latch member, a prime mover device, and a linear actuator; wherein: the controller circuit is configured to move the linear actuator in a first substantially linear direction by way of the prime mover device to thereby cause the access member to be released, thereby allowing access to the secure compartment; and the controller circuit is also configured to move the linear actuator by way of the prime mover device in a second substantially linear direction that is substantially opposite of the first direction, to thereby cause the holding member to be released, thus allowing the electronic lock box apparatus to be detached from a fixed object.

In accordance with another aspect of the present invention, an electronic lock box apparatus having a holding member attachable to a fixed object is provided, which comprises: an electrical power source, a controller circuit, a secure compartment having an access member actuated by a first latch member, a holding member actuated by a second latch member, an electric motor, a movable actuator member that is in mechanical communication with the electric motor, and a position sensing device; wherein: (1) the controller circuit is configured to attempt to move the actuator member in one of a first direction and a second direction by energizing the electric motor; (2) the position sensing device provides substantially continuous position feedback information corresponding to an actual position of the actuator member; (3) as the controller circuit attempts to move the actuator member, the position feedback is received by the controller circuit, which determines whether the actuator member is moving according to a predetermined movement pattern over at least one predetermined time interval; (4) if the actuator member is moving according to a predetermined movement pattern over at least one predetermined time interval, the controller circuit allows the electric motor to be energized until the actuator member has reached a predetermined position; and (5) if the actuator member is not moving according to a predetermined movement pattern over at least one predetermined time interval, the controller circuit terminates energizing the electric motor, regardless of an actual position of the actuator member.

In accordance with yet another aspect of the present invention, an electronic lock box apparatus having a holding member attachable to a fixed object is provided, which comprises: an electrical power source, a controller circuit, a secure compartment having an access member actuated by a first movable latch member, a holding member actuated by a second movable latch member, an electric motor, a movable actuator member that is in mechanical communication with the electric motor, and at least one position sensing device; wherein: (1) the controller circuit is configured to energize the electric motor and thus move the actuator member in a first direction until the at least one position sensing device determines that the actuator member has moved a sufficient distance that causes the first movable latch member to release the access member, thereby allowing access to the secure compartment; and (2) the controller circuit is configured to energize the electric motor and thus move the actuator member in a second, substantially opposite direction until the at least one position sensing device determines that the actuator member has moved a sufficient distance that causes the second movable latch member to release the holding member, thereby allowing the electronic lock box apparatus to be detached from a fixed object.

In accordance with still another aspect of the present invention, a method for operating an electronic lock box system is provided, in which the method comprises the following steps: (a) providing at least one electronic lock box having a secure compartment therein, a first computer circuit, a first memory circuit, a first device reader port, and a first data entry apparatus; (b) providing a processing apparatus having a second computer circuit, a second memory circuit, a second device reader port, and a second data entry apparatus; (c) providing a portable memory device having a third memory circuit, and at least one electrical conductor for communicating with a device reader port; (d) at the second computer circuit: (i) determining a first present epoch time, determining a predetermined epoch time window for which a portable memory device will be valid, determining a first cryptographic seed value for use with a data encryption function, and determining a user's first identification code; (ii) using the data encryption function, calculating a diversified value based upon both the first cryptographic seed value and the user's first identification code; (iii) coupling the portable memory device to the second device reader port, and communicating the diversified value to the portable memory device; (e) at the at least one electronic lock box: (i) coupling the portable memory device to the first device reader port, and communicating the diversified value from the portable memory device to at least one of the first computer circuit and the first memory circuit; (ii) determining a second present epoch time, determining a second cryptographic seed value; and determining a user's second identification code from a manual entry at the first data entry apparatus; (iii) using the data encryption function, decrypting the first diversified value based upon the second cryptographic seed value, resulting in a third identification code; and (iv) comparing the user's second identification code and the third identification code, and if they match, permitting access to the secure compartment.

In accordance with a further aspect of the present invention, a method for operating an electronic lock box system is provided, in which the method comprises the following steps: (a) providing a central database computer and an electronic lock box at a second physical location; (b) encrypting, at a first real time, a user's identification number using a first encryption seed value that is known only to the central database computer and to the electronic lock box, wherein the first encryption seed value is time dependent; (c) storing the encrypted user's identification number on a portable memory apparatus at the central database computer; (d) transferring the encrypted user's identification number from the portable memory apparatus to the electronic lock box; (e) decrypting, at a second real time, the encrypted user's identification number using a second encryption seed value, thereby resulting in a decrypted ID value; (d) comparing the decrypted ID value to data entered on a keypad at the electronic lock box, and if the data matches the decrypted ID value, allowing access to a secure compartment within the electronic lock box.

In accordance with a yet further aspect of the present invention, an electronic lock box apparatus is provided, which comprises: an electrical power source, a controller circuit, a secure compartment having an access member actuated by a prime mover apparatus, a manual data entry apparatus, and a device reader port; and a portable memory device that connects to the device reader port; wherein, the controller circuit is configured: (a) to determine a present epoch time, to determine a predetermined epoch time window for which the portable memory device will be valid, to determine a cryptographic seed value for use with a data encryption algorithm; (b) to read a first data value that is stored on the portable memory device; (c) to decrypt the first data value using the data encryption algorithm, based upon the cryptographic seed value, thereby determining a second data value; (d) to receive a user's identification code that is entered at the manual entry apparatus; (e) to compare the user's identification code to the second data value; and (f) if the user's identification code is equal to the second data value, to allow access to the secure compartment by actuating the prime mover apparatus to open the access member.

In accordance with a still further aspect of the present invention, an electronic lock box apparatus is provided, which comprises: an electrical power source, a controller circuit, a secure compartment having an access member actuated by a prime mover apparatus, a manual data entry apparatus, and a device reader port; wherein, the controller circuit is configured: (a) to determine whether the electronic lock box apparatus is presently in one of (i) a first, higher security state and (ii) a second, lower security state; (b) if the electronic lock box apparatus is presently in the second, lower security state, access to the secure compartment may be obtained by a proper code, provided through the manual data entry apparatus; and (c) if the electronic lock box apparatus is presently in the first, higher security state, access to the secure compartment may be obtained by a combination of a proper user's identification code, provided through the manual data entry apparatus, and by decrypting a diversified data value from a portable memory device, received through the device reader port.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
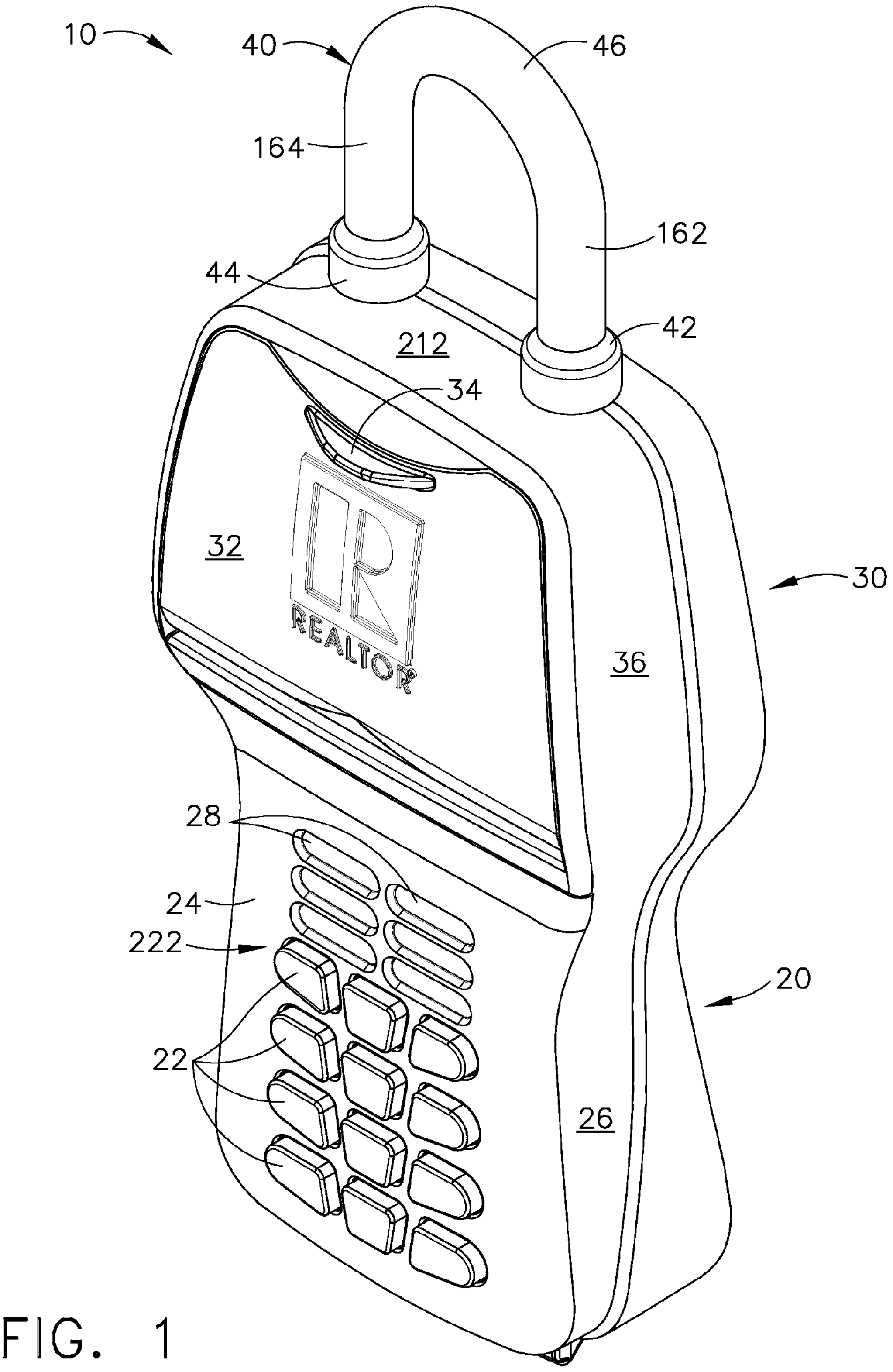
FIG. 1 is a perspective view from the front, right, and above of an electronic lock box, as constructed according to the principles of the present invention.

Referring now to the drawings, FIG. 1 illustrates an electronic lock box generally designated by the reference numeral 10, as constructed according to the principles of the present invention. Lock box 10 has an outer housing, including a lower housing portion 20, and an upper housing portion 30, in which the lower housing includes a keypad 222 at a keypad area 24, and the upper housing includes a moveable key compartment door 32. In the keypad area 24, there are multiple individual pushbutton keys 22, and also on the front surface of the keypad area 24, there is a set of indicator lamps 28 that act as an annunciator.

Figure 8:
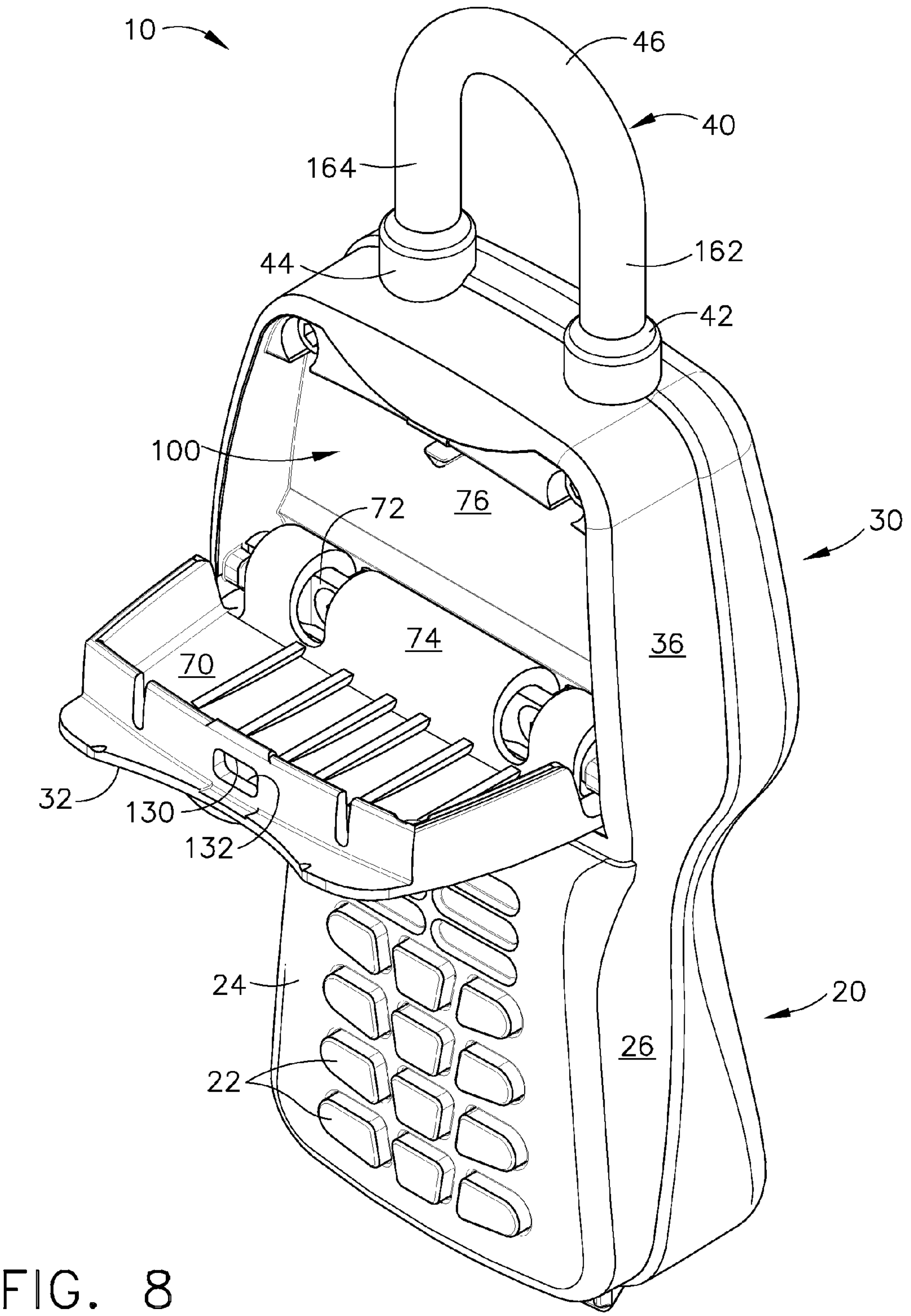
FIG. 8 is a perspective view of the electronic lock box of FIG. 1 from the front, right, and above, in which the key compartment door is open.
Figure 9:
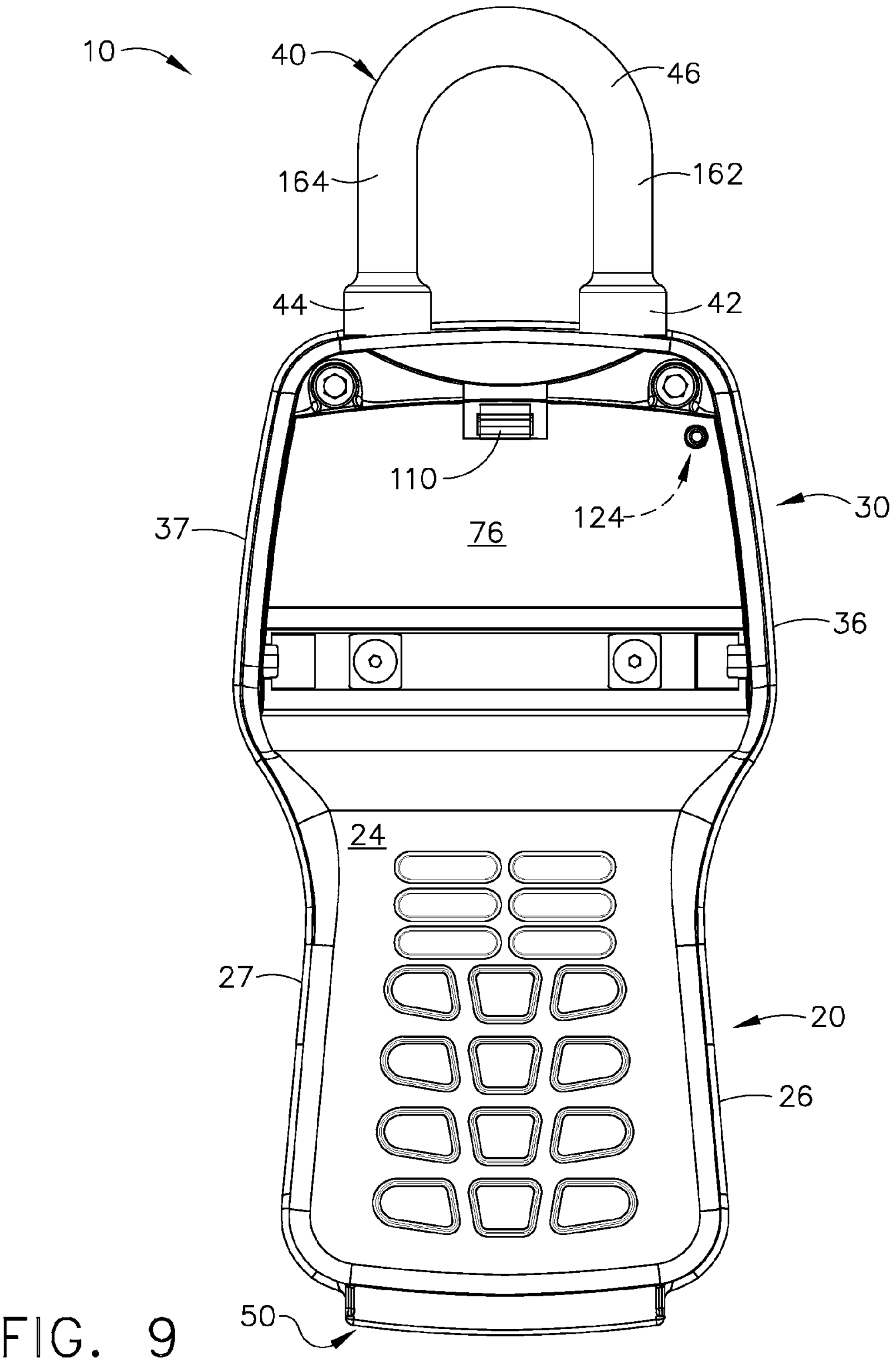
FIG. 9 is a front elevational view of the electronic lock box of FIG. 1, showing some of the interior details with the key compartment door removed.
Figure 16:
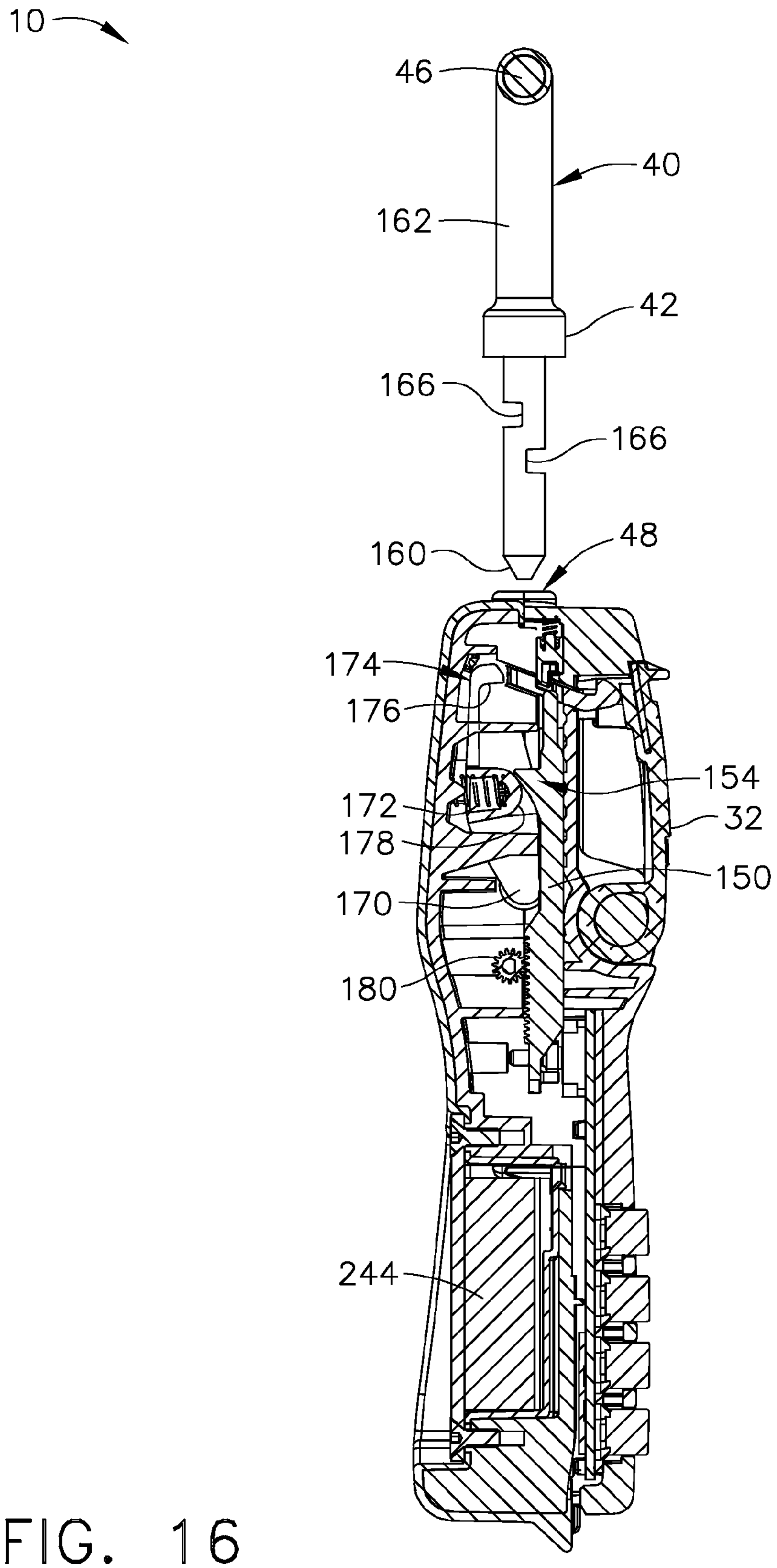
FIG. 16 is a right side elevational view in cross-section of the electronic lock box of FIG. 2, taken along the line 16-16, showing the linear actuator in its extended position in which the shackle is released.
Figure 17:
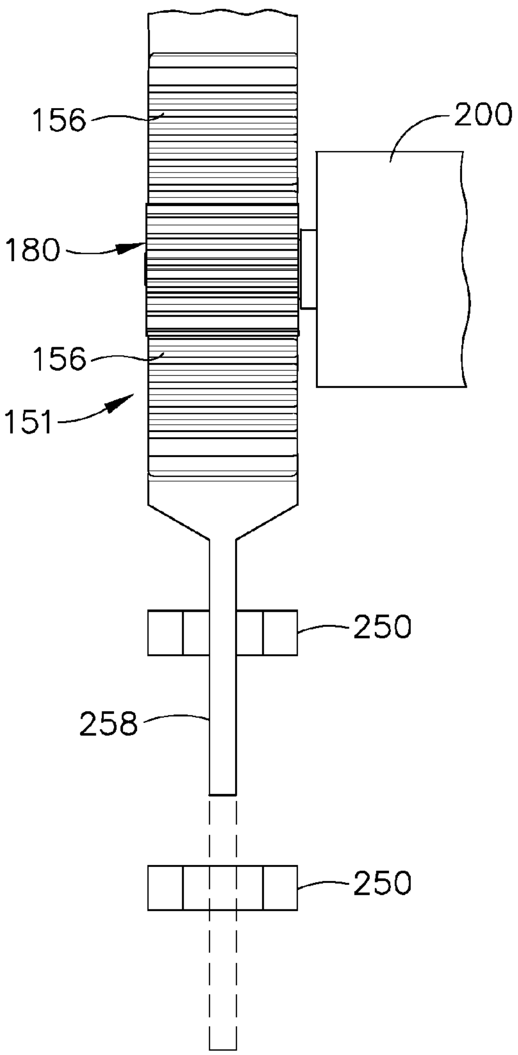
FIG. 17 is an elevational view of an alternative embodiment linear actuator arrangement that uses optocouplers as position sensors.
Figure 19:
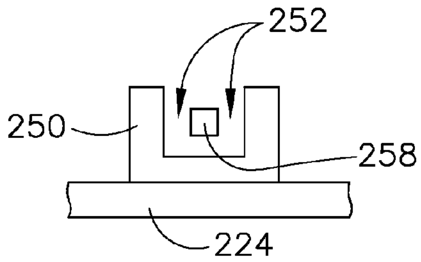
FIG. 19 is an end view of the alternative linear actuator arrangement of FIG. 17.
Figure 18:
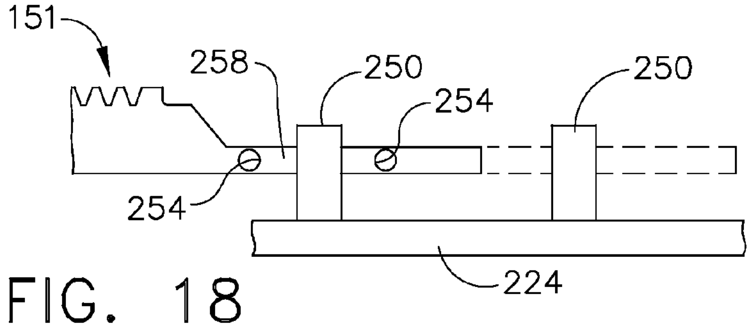
FIG. 18 is a side elevational view of the alternative linear actuator arrangement of FIG. 17.

FIGS. 1-7 illustrate the outer portions of lock box 10 in various views, in which the key compartment door 32 is closed. FIG. 8 illustrates lock box 10 in a view in which the key compartment door 32 is open. Referring back to FIG. 1, the upper housing of lock box 10 is illustrated at 212, and includes two receptacles 48 (see FIG. 16) that receive a shackle 40. The shackle 40 has an upper portion 46 and two shackle extensions 164 and 162 that fit through the receptacles 48. The shackle also includes two "rain caps" at 42 and 44 of increased diameter, which also act as mounting stops. In FIG. 1 a key compartment door handle 34 can be seen, which assists a user in opening the key compartment door 32.

Figure 2:
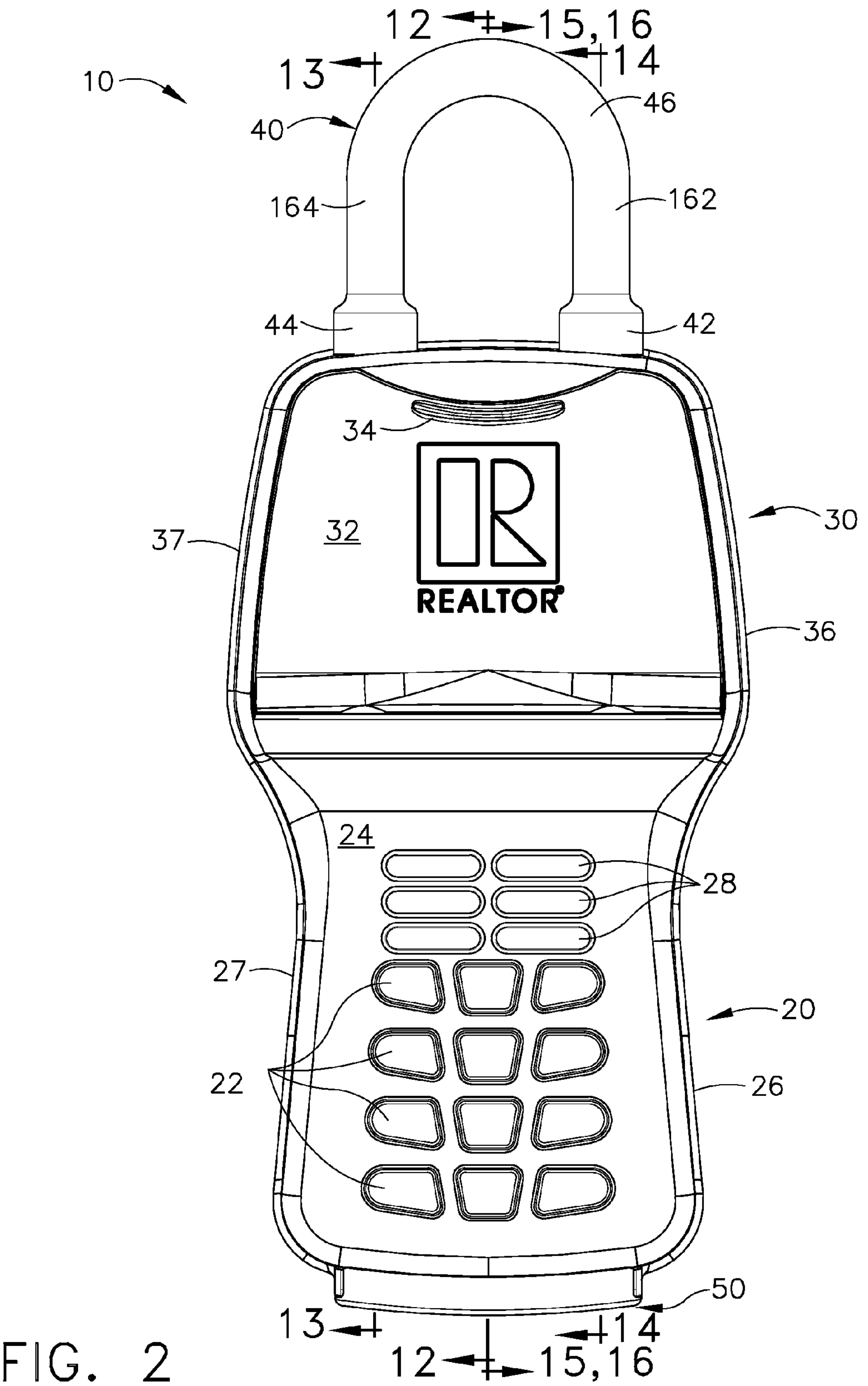
FIG. 2 is a front elevational view of the electronic lock box of FIG. 1.

Referring now to FIG. 2, the lower housing portion 20 has a right side 26 and a left side 27 (as viewed in FIG. 2). The upper housing portion 30 exhibits a right side 36 and a left side 37 (also as viewed in FIG. 2). An electrical connector 50 is positioned at the bottom of the lock box as viewed in FIG. 2. This is designed to receive a memory card 12 that may also contain a microcomputer chip, and such memory cards are sometimes referred to as "smart cards." In FIGS. 5-7, other portions of the lock box 10 can be seen, including a rear surface 60 of the upper housing portion, a rear surface 62 of the lower housing portion, and a battery compartment door or cover 64. The bottom surface 54 of the lower housing is also visible in FIG. 7.

Referring now to FIG. 8, a secure compartment, generally designated by the reference numeral 100, is visible since the key compartment door 32 has been opened. This secure compartment 100 will also be referred to herein as the "key compartment," which is a volumetric space that can contain one or more mechanical keys that typically are used to unlock doors to a building or other structure. A hinge pin 72 is visible in FIG. 8, and a corresponding hinge cylinder 74 is visible. The hinge pin 72 is the axis of rotation or pivoting for the key compartment door 32. The rear interior surface of key compartment 100 is designated at 76, while the inner surface of key compartment door 32 is depicted at reference numeral 70. FIG. 8 also shows certain details of the key compartment door, such as the key compartment door's latch receptacle 132, and a corresponding latching surface 130. These components will be described in greater detail below with respect to the mechanical operations of the electronic lock box 10.

Mechanical Operation—Nominal Locked State

Operation of the lock box 10 will now be described. Some of the mechanical components, as illustrated in FIGS. 9-19, include a key compartment latch member 110, a key compartment latch coil spring 120, a locking pin 140, a locking pin spring 142, the key compartment door 32, a linear actuator 150, a shackle latch member 170, a shackle latch spring 172, the shackle 40 (which extends into the interior area of the lock box 10), a spur gear 180, a potentiometer lever 192, a gear motor 200, an inner surface 214 of the front housing, an inner surface 216 of the back housing, and a hinge pin 72 for key compartment door 32. Other components also will be introduced in the description, below.

When the lock box 10 is in its nominal locked state, key compartment door 32 is retained in an immovable closed state by the key compartment latch member 110. Latch member 110 is held in place by locking pin 140, which engages a notch 112 in the outer surface of latch member 110. Locking pin 140 is held in position by locking pin spring 142. The latch member's latching surface 130 is used to engage with a latch receptacle 132 of key compartment door 32. A smaller key compartment latch spring 124 is compressed while the key compartment door 32 is closed.

In this locked state, it should also be noted that the linear actuator 150 is positioned such that its key compartment lifter end 152 is not engaged with the key compartment latch member 110, and the triangular "wedge" portion 154 of linear actuator 150 is not engaged with the shackle latch member 170. In this state, shackle 40 is retained in an immovable state by shackle latch member 170. Shackle latch spring 172 is compressed sufficiently between shackle latch member 170 and the inner surface 216 of the lock box back (or rear) housing, thus preventing shackle latch member 170 from disengaging from latching slots 166 in the shackle's left extension 164 and right extension 162, and thus preventing shackle 40 from moving undesirably.

Key Compartment Control

When a user enters appropriate information at the lock box's keypad 222, the lock box key compartment 100 can be accessed when the key compartment door 32 is opened. In this mode of operation, key compartment door 32 acts as an "access member," as it either prevents (by remaining closed) or allows (by opening) access to the interior region of the secure area of the key compartment 100, itself. It is desirable for the key compartment door to be constructed of substantially strong materials (such as metal) to make it difficult for a person to break into the secure area 100 without having the proper access means to operate the lock box 10 in a manner that would appropriately open the key compartment door 32 (i.e., by a "normal" procedure).

In response to the correct user command entered on lock box keypad 222, the "gear" motor 200 receives electrical energy from a printed circuit board 224 that contains a controller circuit with an appropriate driver circuit that interfaces with motor 200. A set of FET driver transistors 246 are used in the embodiment illustrated schematically on FIG. 20, and when correctly energized and triggered, an electrical current flows therethrough, causing an output shaft 202 of gear motor 200 to rotate in a clockwise direction (in this particular hardware configuration, for opening the key compartment door). The spur gear 180, connected to gear motor shaft 202, also then rotates in the clockwise direction.

Figure 12:
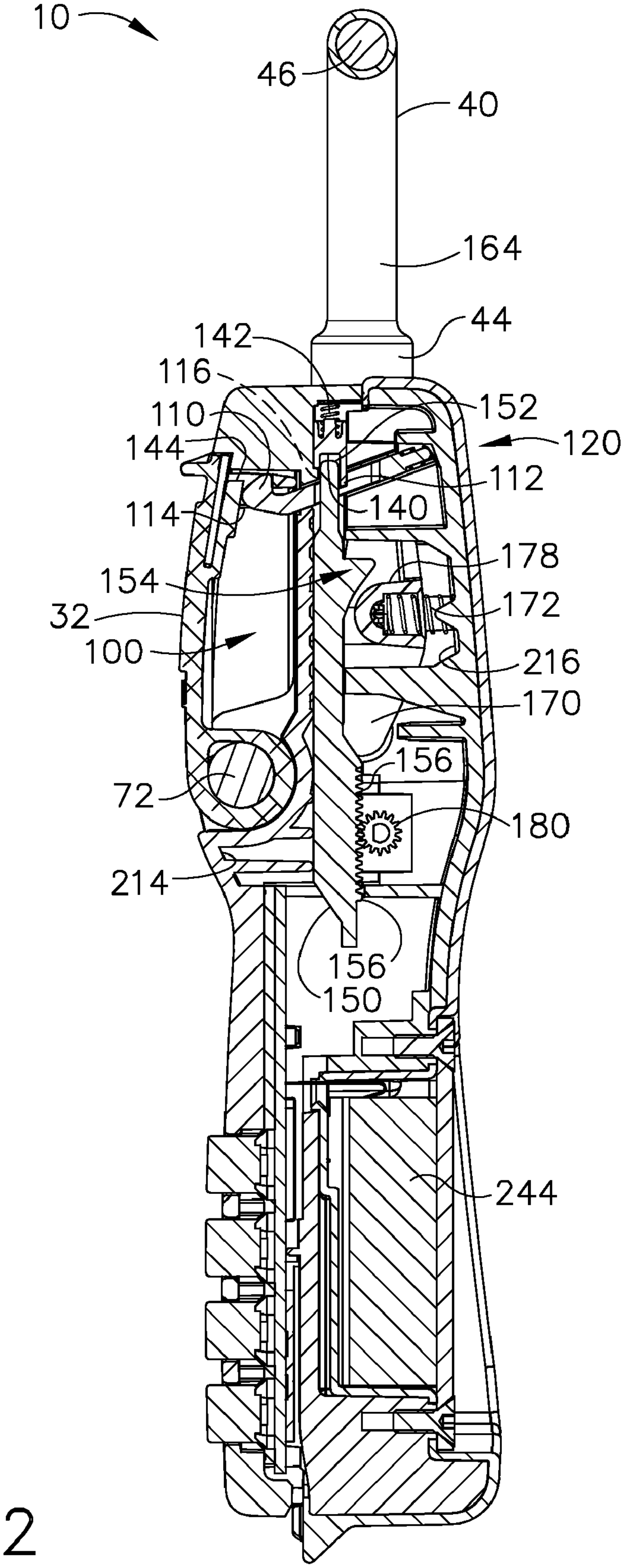
FIG. 12 is a right elevational view in cross-section of the electronic lock box of FIG. 2, taken along the line 12-12.
Figure 13:
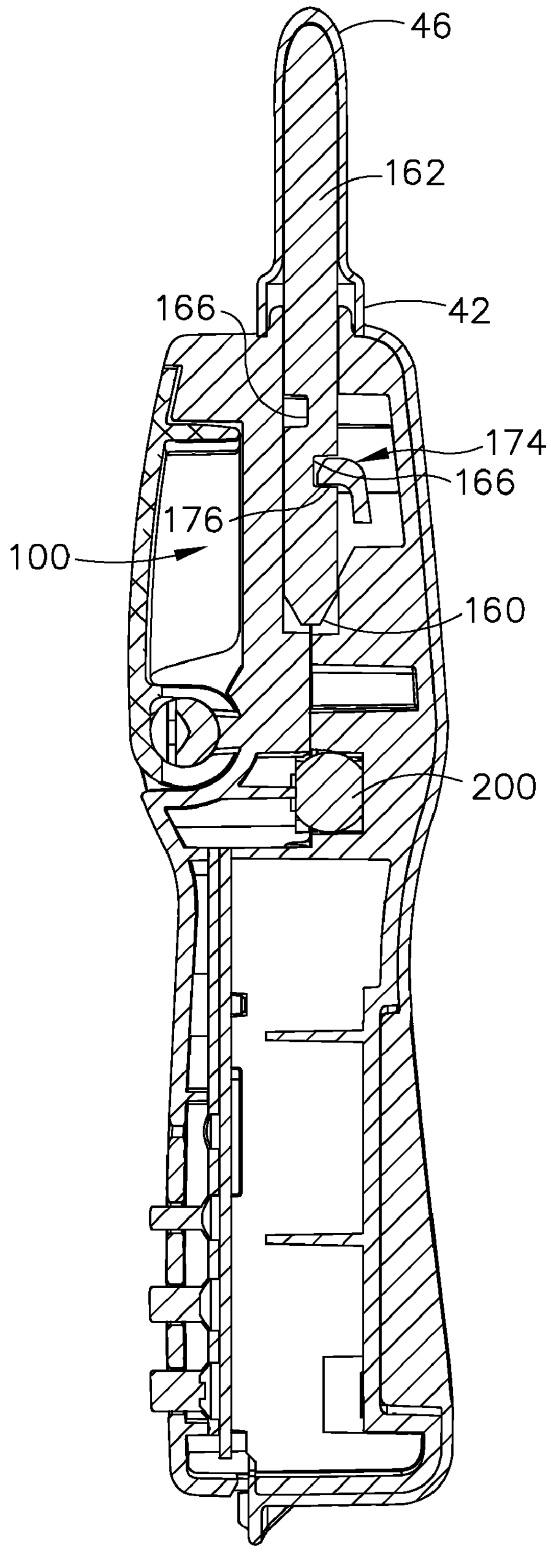
FIG. 13 is a right elevational view in cross-section of the electronic lock box of FIG. 2, taken along the line 13-13.

Spur gear 180 engages integral rack gear teeth 156 on the linear actuator 150, thus causing linear actuator 150 to travel linearly toward key compartment latch member 110 (in the upward direction as seen in FIG. 12). The "lifter end" 152 of linear actuator 150 contacts the locking pin 140 and pushes it upward. In this mode of operation, the motor 200 acts as a "prime mover" for lock box 10. It will be understood that a different type of prime mover device could be used other than an electric motor, without departing from the principles of the present invention. For example, a pneumatic-operated device or a hydraulic-operated device could be used, in lieu of the electric motor 200; or perhaps an electrically-powered solenoid could be used.

When locking pin 140 clears the notch 112 in key compartment latch member 110, then key compartment latch member 110 is free to move and is pushed outward (i.e., toward the left as viewed on FIG. 12) by the key compartment latch spring 120. A leading edge 114 of key compartment latch member 110 contacts the interior surface of key compartment door 32 pushing it outward in an opening direction. As key compartment latch member 110 moves outward (i.e., leftward in FIG. 12), it also moves in a somewhat downward direction (again, as seen in FIG. 12), thus causing the mating latch surface 144 and key compartment door surface 130 to disengage from one another, and the key compartment door 32 then becomes free to rotate about the hinge pin 72.

After the door 32 becomes free to rotate on hinge pin 72, the door 32 will open in a manner as illustrated in FIG. 8, thereby allowing access to the secure compartment 100 of lock box 10. The key compartment latch coil spring 120 will tend to quickly push the door 32 open (see FIG. 15). Latch member 110 contains a slot 116 which linear actuator 150 passes through. This slot 116 limits the maximum "outward" travel of latch member 110 to ensure that the latch member is properly retained inside the lock box.

Upon completion of the release of key compartment door 32, voltage to the gear motor 200 can be reversed for a short time, which would cause linear actuator 150 to briefly travel away from key compartment latch member 110 (this voltage reversal is not a requirement). The locking pin spring 142 pushes locking pin 140 up against latch member 110 such that later movement of latch member 110 up and into the housing will allow locking pin 140 to engage the notch 112 in latch member 110.

When a user later closes key compartment door 32, the door rotates freely on hinge pin 72 until the inner surface 70 of key compartment door 32 contacts the leading edge 114 of key compartment latch member 110. When that occurs, the key compartment latch member 110 is pushed at an angle back and up (as viewed in FIG. 12) into the housing by the motion of the key compartment door 32. Upon reaching the desired closed state, the notch 112 in latch member 110 travels a sufficient distance to allow the locking pin 140 to be pushed into place by locking pin spring 142, thereby engaging the notch 112 in latch member 110 in a manner such that latch member 110 is prevented from moving in an outward direction. At this point, the latching surface 130 of key compartment latch member 110 is mated with the latch receptacle 132 of key compartment door 32. This places key compartment door 32 into an immovable closed state.

Shackle Control

When a user enters appropriate information at the lock box's keypad 222, the shackle 40 can be released from the upper receptacles 48 of the lock box housing upper portion 30. In response to the correct user command entered on lock box keypad 222, the "gear" motor 200 receives electrical energy from the controller and driver circuit on printed circuit board 224. The set of FET driver transistors 246 are again used, and when correctly energized and triggered, an electrical current flows therethrough, causing output shaft 202 of gear motor 200 to rotate in a counterclockwise direction (in this particular hardware configuration, for releasing the shackle). The spur gear 180, connected to gear motor shaft 202, also then rotates in the counterclockwise direction.

When this occurs, spur gear 180 engages the integral rack gear teeth 156 on linear actuator 150, thereby causing linear actuator 150 to travel linearly away (i.e., downward as seen in FIG. 12) from the key compartment latch member 110. When a triangular "wedge" portion 154 of linear actuator 150 contacts the shackle latch member 170 at a cam member portion 178, the shackle latch member 170 begins to pivot away from shackle 40. The shackle latch member 170 pivots at two bushings 182. Upon reaching a sufficient angular movement, latching surfaces 176 of shackle latch member 170 no longer interfere with the set of latching slots 166 in shackle 40. When this occurs, shackle 40 is allowed to be freely moved, and may be pulled completely away from the electronic lock box 10 (i.e., the shackle's right and left extensions 162 and 164, respectively in FIG. 10, may be fully detached from the receptacles 48). See FIG. 16, which depicts the released state for the shackle 40.

A typical use of the shackle 40 is to act as a "holding member," by which the electronic lock box 10 as a unitary structure is held to a fixed object, such as a doorknob of a dwelling or other type of building structure. When shackle 40 is released from the receptacles 48, it can also be removed from such a doorknob, thus allowing the lock box 10 to be taken away from the building structure. Of course, when shackle 40 is not released from lock box 10, its main purpose is to literally hold the lock box 10 to the building structure by surrounding the doorknob (or other fixed structure if desired). Unless a person can operate the shackle release, he or she would have to break the shackle or the doorknob to remove the lock box 10 from the building structure. (Of course, lock box 10 can also be used to lock security gates or fences, if desired.) The shackle 40 can be obtained in various different sizes to allow for attachment to more than one size of doorknob, or to allow the shackle to be attached to some other type of fixed object that is not sized or shaped like a doorknob.

After the shackle 40 has been released, voltage to gear motor 200 can be reversed for a short time, which would cause the linear actuator 150 to briefly travel toward the key compartment latch member 110. (This voltage reversal is not a requirement.) The shackle latch spring 172 urges shackle latch member 170 to pivot until shackle latch member 170 contacts the inner surface 214 of the front of lock box housing 210. Once that has occurred, the shackle latch member 170 is in position to receive the latching slots 166 on the shackle's extensions 162 and 164, when shackle 40 is later re-inserted by the user.

When a user inserts the free ends 160 of shackle 40 into the lock box top housing portion 212 (at receptacles 48), the shackle 40 slides along hollow cylindrical guides 218 in the lock box housing 210 until it contacts the shackle latch member 170. The free ends 160 of shackle 40 are chamfered, and they engage the chamfered ends 174 of the shackle latch member 170, thus causing shackle latch member 170 to deflect a short distance and allow the ends 160 of shackle 40 to slide under shackle latch member 170. When this occurs, the latching surfaces 176 of shackle latch member 170 slide along the side of the shackle's extensions 162 and 164 until latching surfaces 176 reach, and engage, the latching slots 166 on shackle 40. When shackle 40 reaching this position, the force from the shackle latch spring 172 causes shackle latch member 170 to move forward and engage these latching slots 166 with the shackle's latching surfaces 176. (See FIGS. 13 and 14.) This then places shackle 40 into an immovable locked state.

Figure 14:
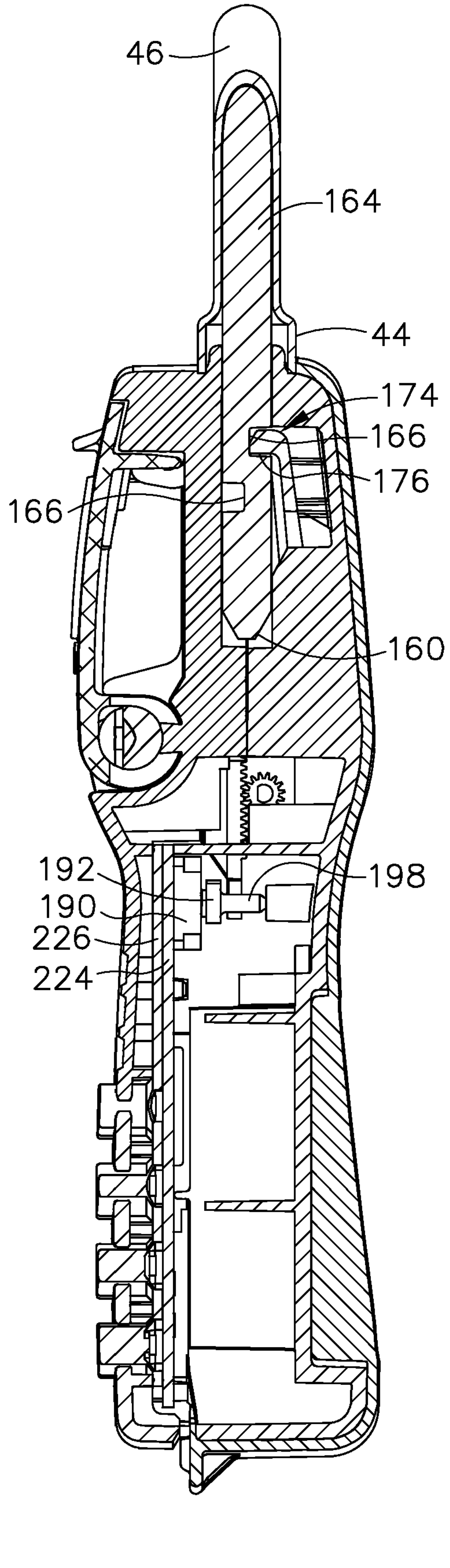
FIG. 14 is a right elevational view in cross-section of the electronic lock box of FIG. 2, taken along the line 14-14.
Figure 15:
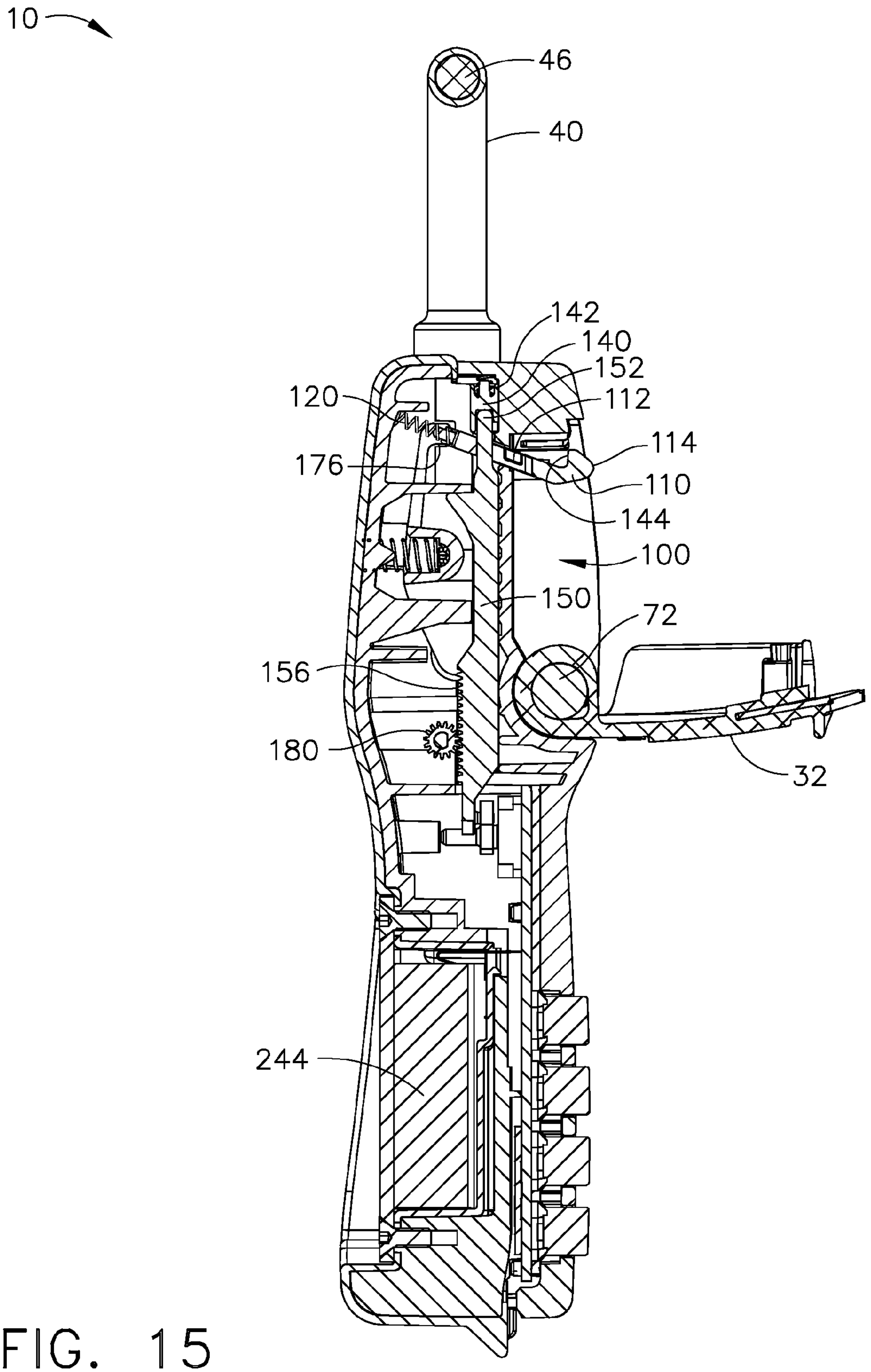
FIG. 15 is a right side elevational view in cross-section of the electronic lock box of FIG. 2, taken along the line 15-15, showing the linear actuator in its extended position in which the key compartment door is opened.

In FIG. 14, a keypad membrane 226 can be seen to contact one surface of the printed circuit board 224. This membrane 226 will preferably be made of a translucent material, and can be made to completely cover the PC board 224 in a manner so as to protect the PC board and the rest of the interior components of the electrical compartment 220 from the weather. The batteries 244 will also be protected by this membrane 226, as seen in FIG. 12.

It will be understood that a major portion of the electronic lock box 10 could be utilized in a situation in which the secure compartment is to be permanently mounted to a building or structure. In other words, a shackle would not be at all necessary; the lock box could be literally welded to a structure, if desired. In such circumstance, the major components of the lock box 10 of the present invention could still be used, however, the linear actuator 150 would only need to work in one direction. The key compartment access would become the only primary function of such a device, since this modified lock box construction would have no need to be moved to another location. However, the software security routines described herein would still be very useful in this modified lock box construction, and thus, the principles of this part of the present invention nevertheless would apply to the same extent.

Motion Control

During movement of the linear actuator 150, as described above, the coupled potentiometer lever 192 rotates about its axis, in relation to the linear travel of linear actuator 150. The linear actuator 150 exhibits an integral connection pin 158 that rides in an integral linkage slot 196 of the potentiometer lever 192, which causes a shaft 198 of a potentiometer 190 to rotate when linear actuator 150 moves. The linkage slot 196 on potentiometer lever 192 is designed to be of sufficient length to allow for the total arc motion travel of lever 192 versus the linear motion of linear actuator 150.

The wiper arm 194 of potentiometer 190 (see FIG. 20) is electrically connected to an integral analog to digital converter input 232 of a computer/processor device (or "CPU") 230. The remaining legs of potentiometer 190 are electrically connected to a positive supply voltage at 240 and circuit common (or "ground") at 242, thus making the wiper arm 194 of potentiometer 190 into a voltage divider. The output voltage of potentiometer 190 is measured by an on-board analog-to-digital (ADC) circuit 234 to determine the corresponding angular position of potentiometer lever 192.

The voltage supplied to motor 200 is controlled by CPU 230 such that, when an angle of the potentiometer's lever 192 reaches a particular position that corresponds to a desired linear position of linear actuator 150, then voltage is turned off to motor 200. Under control of the CPU 230, the polarity of the current is momentarily reversed through motor 200 to provide some braking to assist in overcoming mechanical component inertia, thus stopping linear actuator 150 accurately at its desired linear position.

In an alternate embodiment, potentiometer lever surface may be replaced by a spur gear 199 that is mounted on the shaft 198 of the pot 190. In this configuration, the gear rack teeth 156 of linear actuator 150 couple to the potentiometer spur gear 199, thereby providing rotation information of the potentiometer's shaft 198 in relation to the linear travel of linear actuator 150.

In yet another alternative embodiment, potentiometer 190 and potentiometer lever 192 are entirely replaced with two common photo interrupter devices 250 (see FIGS. 17-19) that can be mounted on the PC board 224. A portion of an alternative linear actuator 151 passes through slots 252 in both of photo interrupters 250, in which the photo interrupters can comprise standard optocouplers that exhibit a light emitting diode (LED) on one side of the slot 252 and a photodiode or phototransistor on the other side of the slot 252.

Two strategically placed transverse holes 254 in an extension arm 258 of linear actuator 150 allow photo interrupter light to pass through from the LED to the photodiode, for example, when the linear travel of the alternative linear actuator 151 reaches the desired positions. CPU 230 monitors the photo interrupter outputs, which provide four possible unique logic states generated by the pair of photo interrupters 250. These logic states determine which of the positions has been reached by linear actuator 150: e.g., a nominal locked position, a shackle released position, a key compartment released position, or an "unknown" or "don't care" position that should not occur if the electrical components are operating correctly.

Protective System

During motion of linear actuator 150, the software or firmware being executed by CPU 230 analyzes the analog input readings from the on-board ADC 234 in an attempt to match the expected motion of linear actuator 150 during normal operations. (This assumes that an analog signal that varies with position of the linear actuator 150 is provided; i.e., this would not be the alternative embodiment that uses the two photo interrupter devices 250.) The rates of motion of linear actuator 150 may vary greatly depending on the ambient lock box temperature and the output voltage being provided by battery 244. For example, in conditions of comparatively low temperature or low battery voltage, the motion of linear actuator 150 will likely be slower over time, as compared to the condition in which a fresh battery at room temperature is available, which will result in faster movements of linear actuator 150.

In one mode of the present invention, the control software of CPU 230 will not attempt to energize the H-bridge 246 driver circuit until after the present ambient temperature is detected from a lock box temperature sensor 260. The control software of CPU 230 then causes its on-board ADC 234 to read the present battery 244 voltage. Battery voltage and ambient temperature are then used to calculate expected motor acceleration, and also determines a range of acceptable linear actuator 150 travel over time (i.e., a range of acceptable velocities for the linear actuator). If the control program of CPU 230 determines that motion of linear actuator 150 does not meet the expected range of travel over time, then CPU 230 can perform an alternate function; it may reverse the current through gear motor 200 in an attempt to free linear actuator 150, it may turn off current to gear motor 200 to prevent damage to the lock box electrical components.

Figure 10:
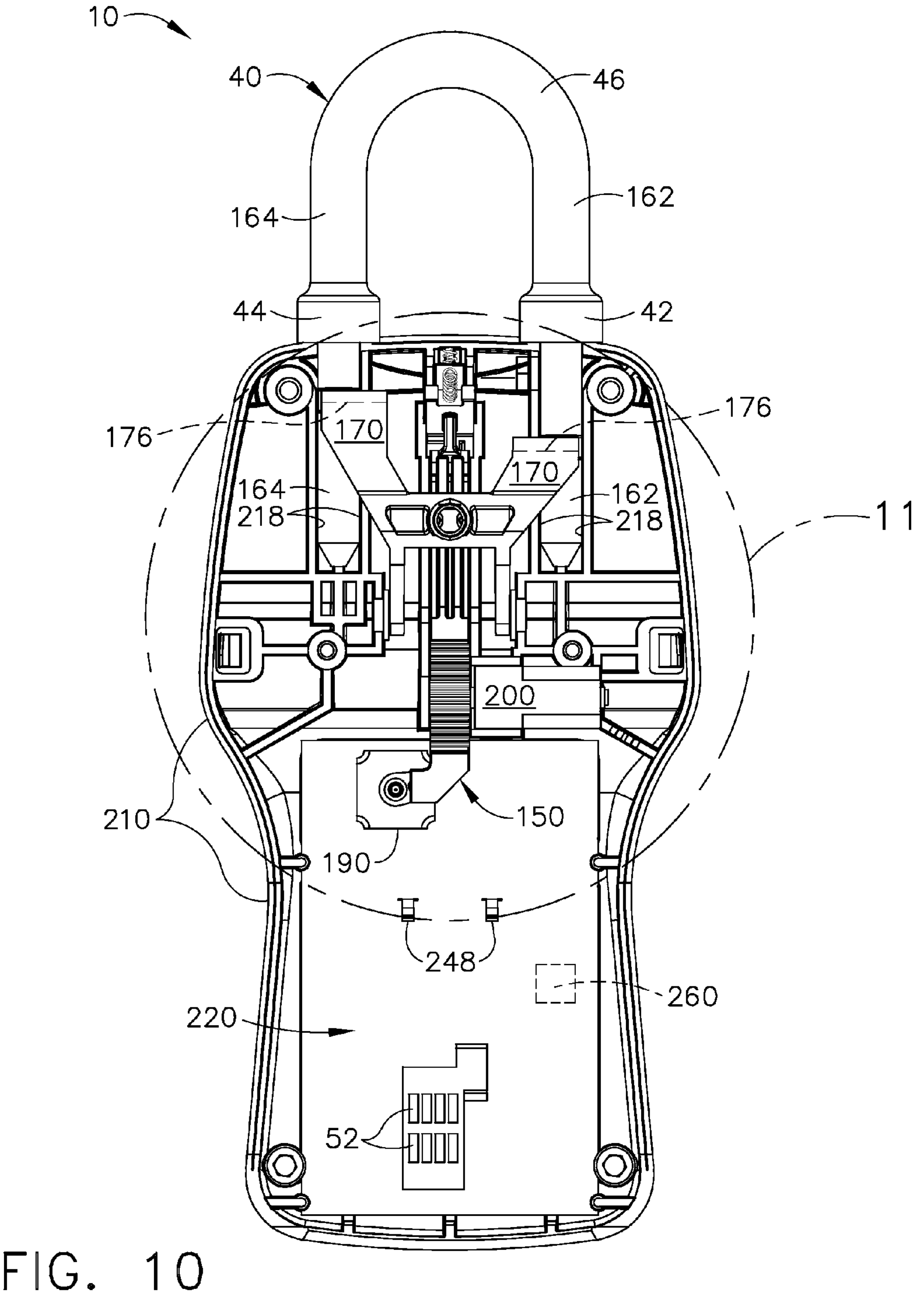
FIG. 10 is a rear elevational view of the front half of the electronic lock box of FIG. 10, showing this "front half" of the device after it has been separated from the "back half," and showing some of the mechanical components that are built into this front half of the lock box.
Figure 11:
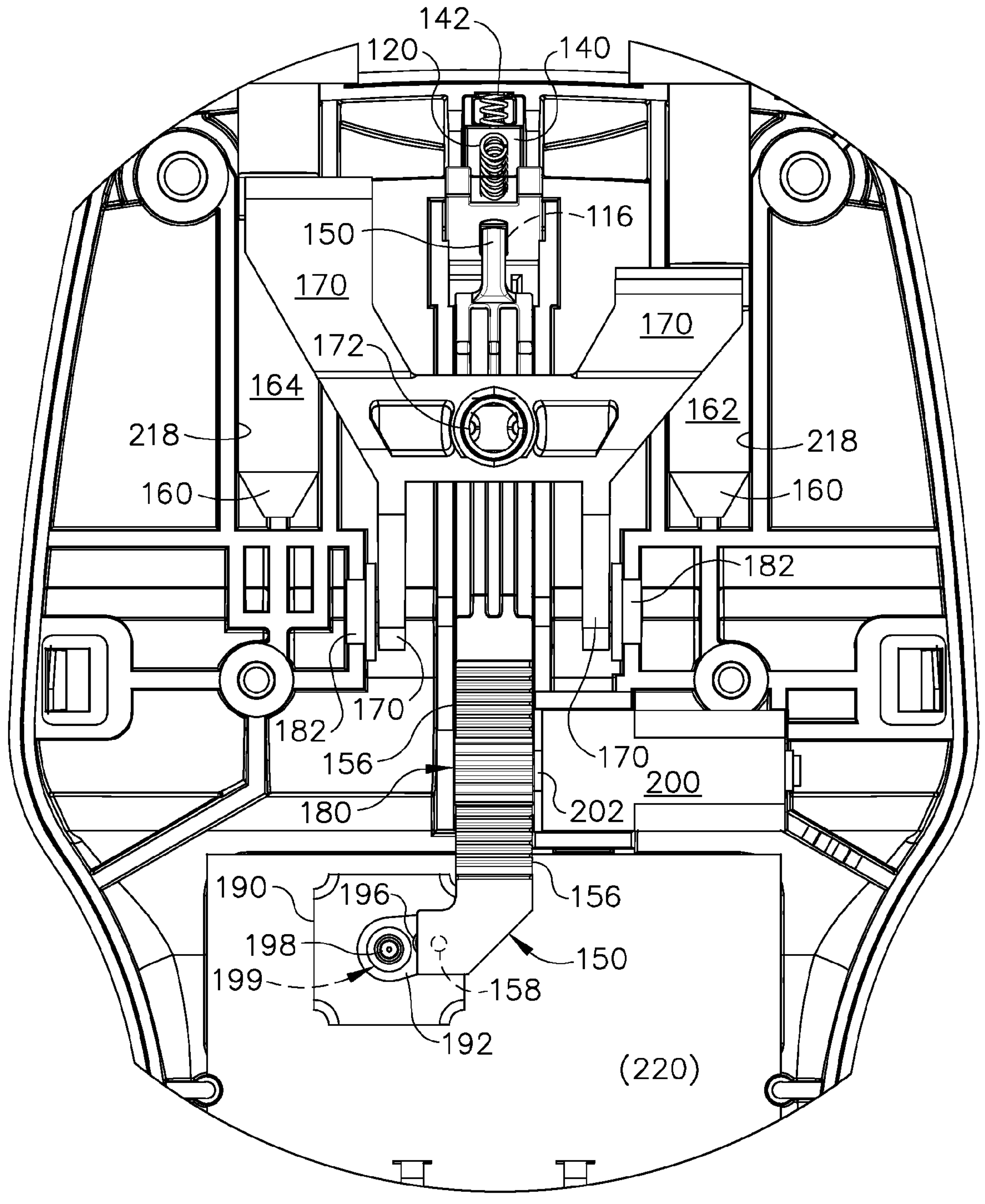
FIG. 11 is a magnified view of some of the mechanical components illustrated in FIG. 10.

FIG. 10 also illustrates some of the other components that have not been described above. For example, a compartment for holding the electrical components and batteries is generally designated by the reference numeral 220. The batteries themselves are not illustrated in FIG. 10, but the electrical connectors that they connect to are illustrated at 248. A small set of electrical connectors that mate to a smart card is illustrated at 52, which could be a small printed circuit board if desired. This electrical compartment area 220 also can contain a temperature sensor at 260, if one is desired for a particular design.

Figure 3:
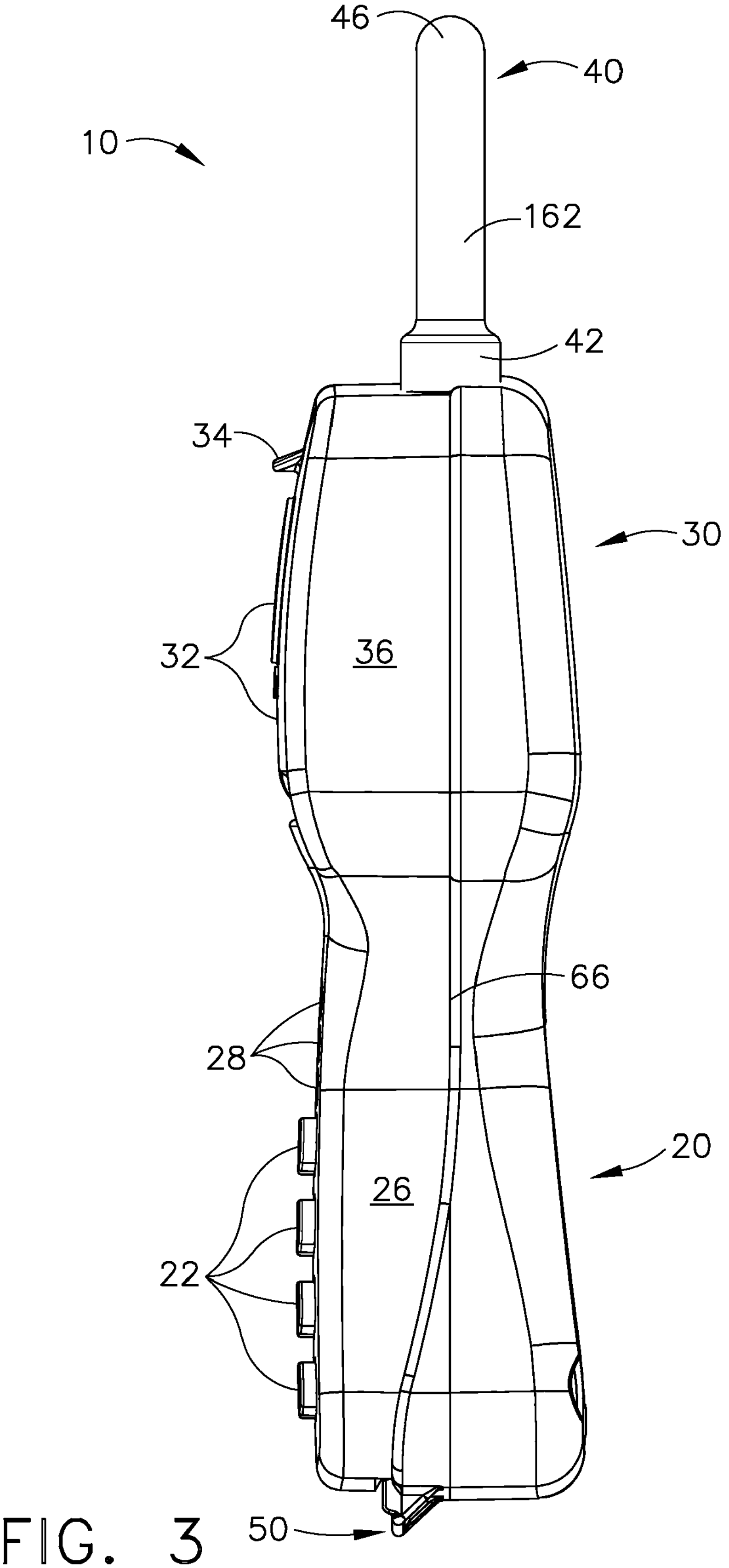
FIG. 3 is a right side elevational view of the electronic lock box of FIG. 1.
Figure 4:
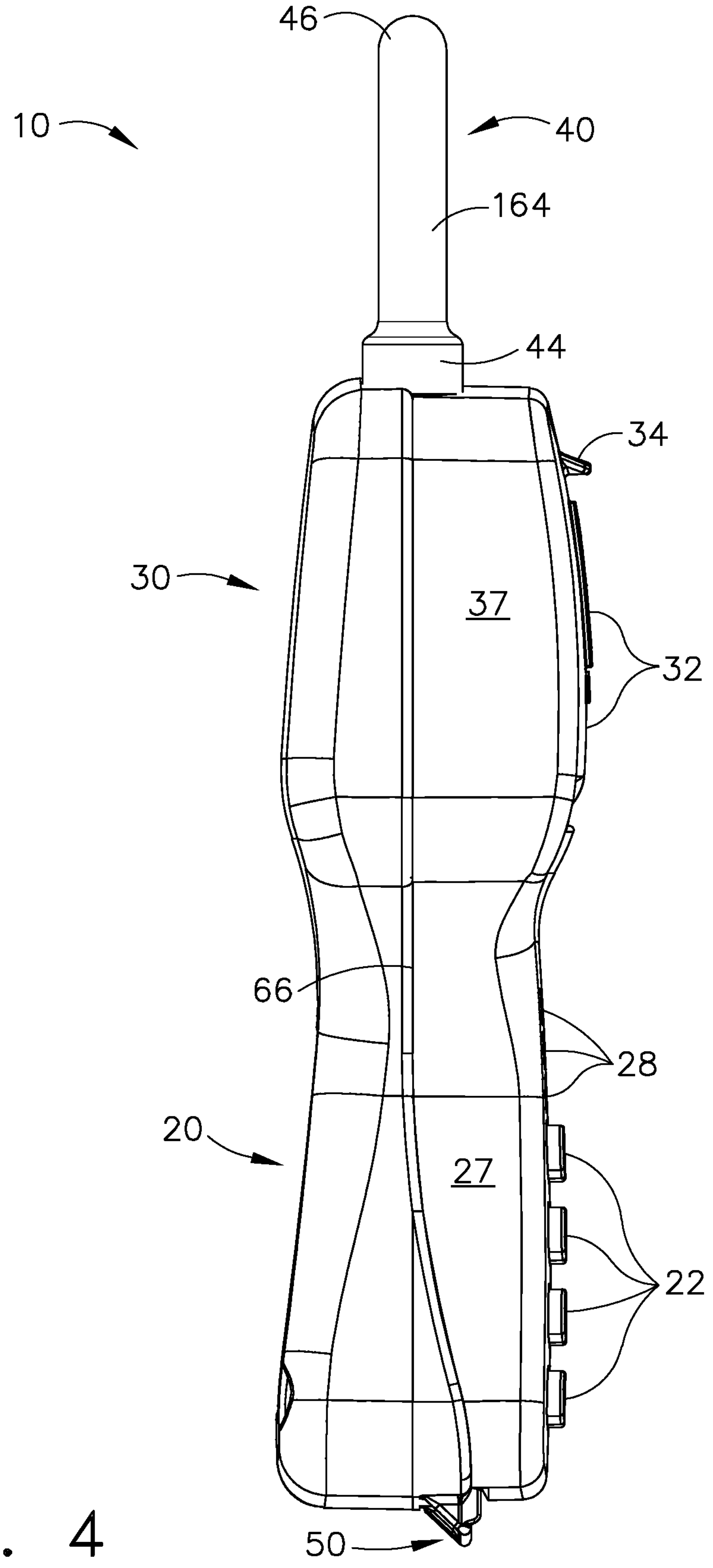
FIG. 4 is a left side elevational view of the electronic lock box of FIG. 1.
Figure 5:
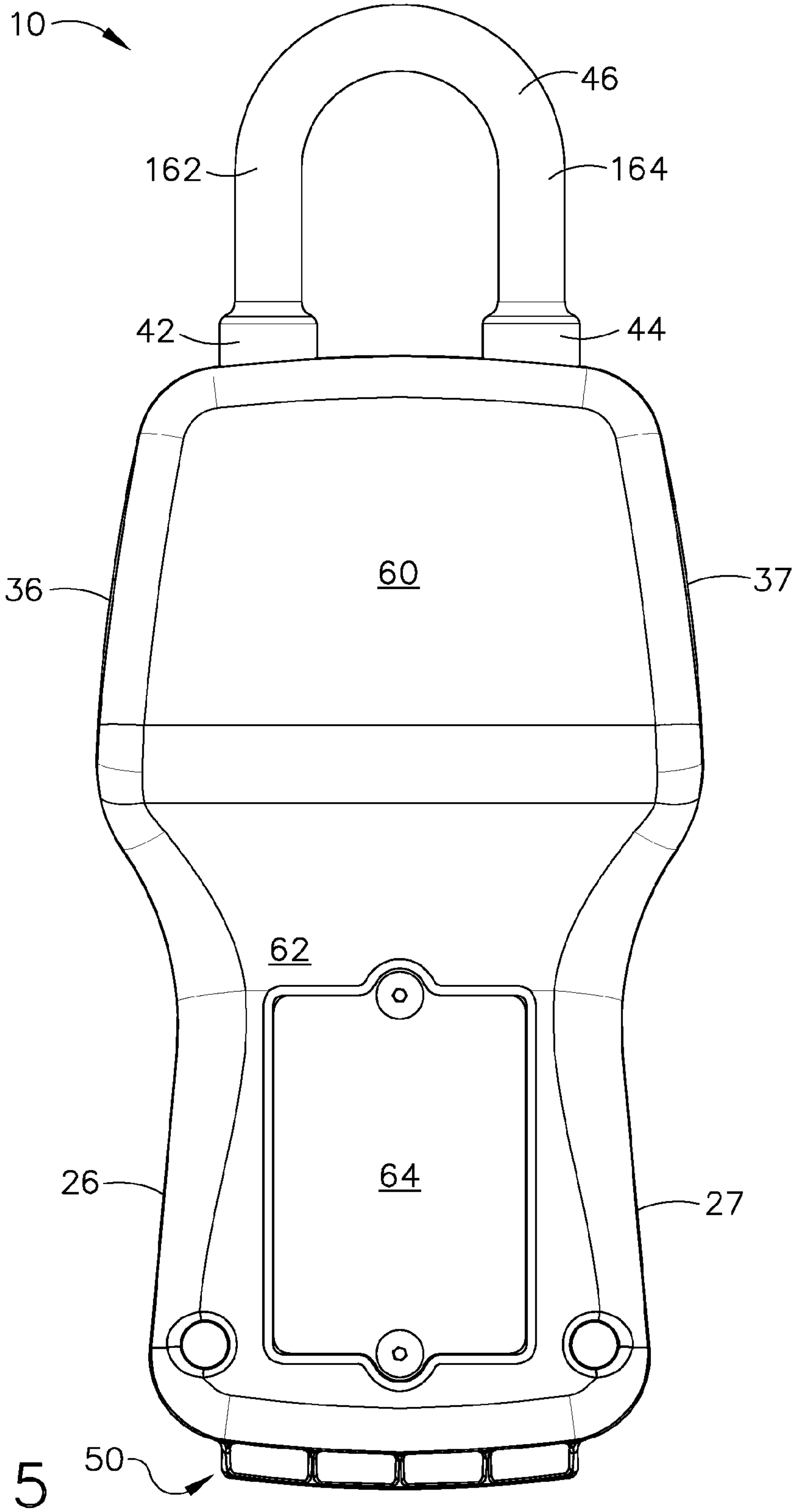
FIG. 5 is a rear elevational view of the electronic lock box of FIG. 1.
Figure 6:
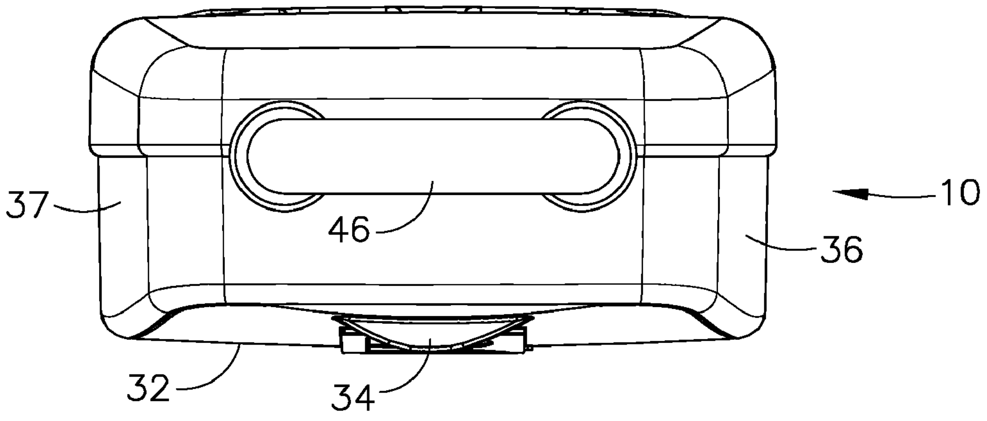
FIG. 6 is a top plan view of the electronic lock box of FIG. 1.
Figure 7:
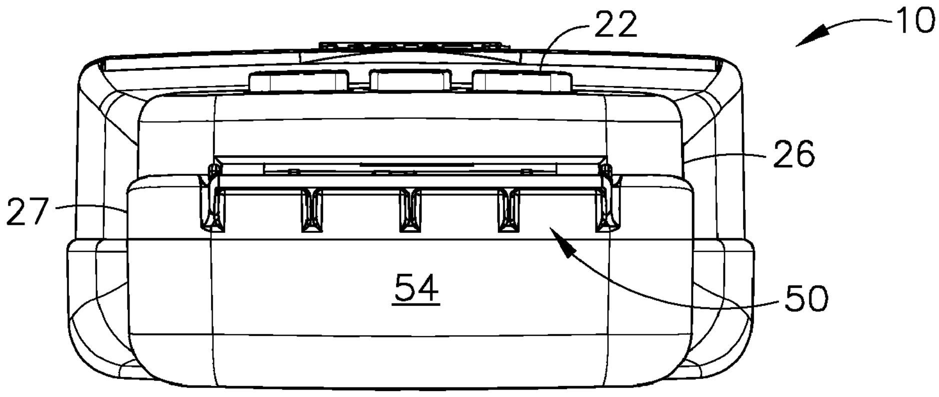
FIG. 7 is a bottom plan view of the electronic lock box of FIG. 1.

In this view of FIG. 10, the interior of the front portion of the overall housing 210 is depicted, and the components illustrated will remain attached to the front portion of the housing when the rear portion of the housing is separated from the front, along a separation line 66 (see FIGS. 3 and 4). In a preferred mode of the present invention, there is a protective outer rubberized cover (not shown) over the back or rear portion of the housing. This protective cover provides a seal against moisture intrusion along the parting line (or separation line) 66, and also protects the finish of a door or other structure where the lock box 10 is mounted. In one mode of the invention, this rubberized cover is compressed between the front and back halves of the housing, along the parting line 66, when the two halves are assembled.

The rubberized cover can also provide raised sealing surfaces at the shackle insertion openings (or receptacles) 48 in the upper housing 212 of lock box 10. These sealing surfaces at 48 are overlapped by the rain caps 42 and 44, and this type of arrangement can be important in preventing rain from entering the lock box 10 at these openings 48.

Figure 20:
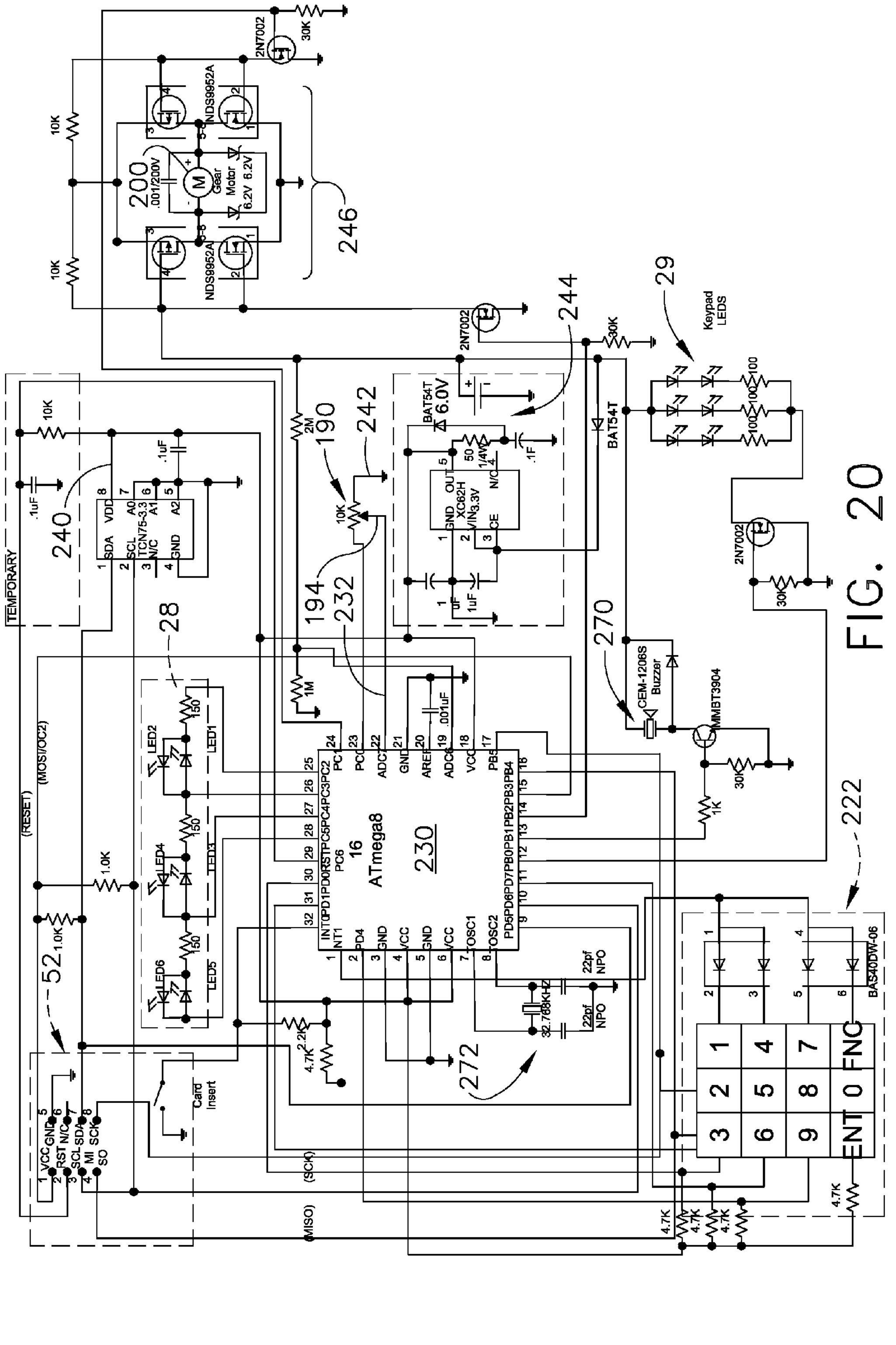
FIG. 20 is an electrical schematic diagram of most of the electrical and electronic components of the illustrated embodiment for the electronic lock box of FIG. 1.

FIG. 20 is an electrical schematic diagram that depicts most or all of the electrical components that reside in the electrical subassembly area 220 of the electronic lock box 10. Some of the major components include a microcontroller 230, which includes an ON-board analog-to-digital converter 234, as described above. On FIG. 20, the ADC analog input is at reference numeral 232. The wiper 194 of the potentiometer 190 is connected to this analog input 232, and in this circuit diagram, the other leads of the potentiometer 190 are connected to a DC common or ground at 242, and to a signal line connected to a pinout of the microcontroller 230 that is internally connected to a +V power supply voltage. A voltage regulator is also included on the schematic diagram, and its power supply rail $V_{DD}$ is at reference numeral 240.

The batteries are schematically depicted at 244 on FIG. 20, and in this illustrated embodiment, the batteries add up to +6.0 volts DC, although other supply voltages could readily be used, particularly if a different microcontroller or microprocessor was used instead of the ATmega8 that is depicted on FIG. 20. The output driver FET's are also illustrated on FIG. 20 at 246, and these four FET's are configured in an H-bridge connection to drive the gear motor 200.

Other major components on the schematic of FIG. 20 include the keypad 222, a crystal clock oscillator circuit 272, a set of LED's that make up the indicator lamps (or annunciator) 28, a second set of LED's 29 that illuminate the keypad pushbuttons 22 (for good visibility at night), the smart card connector contacts at 52, and a buzzer 270, in which a piezo audible buzzer would be suitable. Additional information is provided below in the form of a parts list for the components depicted in FIG. 20 in this illustrated embodiment, as follows:

| | |
|---|---|
| AASC3216016105M | CAP,TANT,3216, 1UF, +−20%, 16 V, TE |
| VRXC62H33 | IC, VOLT REG, 3.3 V,+−2.0%, XC62H, SOT-89-5 |
| AASXTAL32K | CRYSTAL, SMD, 32.768 KHZ, 12.5PF, MC-306, T/R |
| ICATMEGA8 | ATMEL MICROCONTROLLER ATMEGA8L-8AI |
| HBZSENTRI | BUZZER PC MOUNT SENTRILOCK |
| C0805050102J | 1000PF 50 V +/−5% CER 0805 SMT CAP |
| C0805050104M | .1UF 50 V 20% CER 0805 X7R PLASTIC T/R |

-continued

| | |
|---|---|
| C0805050220K | 22PF 50 V 10% CER SMT 0805 COG T/R |
| CER5R5473F | .047F 5.5 VOLT DOUBLE LAYER CAP |
| DIOBAS40DW-06 | QUAD SCHOTTKY DIODE PKG SOT-363 |
| DIO54T1SMT | DIODE BAT54T1, SOD-123 |
| ICTCN7533SM | IC TEMP SENSOR SRL 3.3 V 8SOIC |
| CCM041889 | SMART CARD CONNECTOR W/SWITCH |
| LTSTC230RED | LED SM 1206 REAR MOUNT RED |
| LTSTC230YEL | LED SM 1206 REAR MOUNT YELLOW |
| POTSENTRI2 | 5K SMT 15 MM POT W/O SHAFT |
| R0805050101 | 100 OHM 5% SURFACE MNT 0805 SIZE T/R |
| R0805050102 | 1K OHM, 5% RESISTOR, 0805 |
| R0805050103 | 10K OHM 5% SURFACE MNT 0805 SIZE T/R |
| R0805050151 | 150 OHM 5% SURFACE MNT 0805 SIZE T/R |
| R0805050203 | 20K 5% SURFACE MNT 0805 SIZE T/R |
| R0805050303 | 30K OHM 5% SURFACE MNT 0805 SIZE T/R |
| R0805050471 | 470 OHM, 5% RESISTOR, 0805 |
| TR2N3904SMT | MMBT3904, NPN TRANSISTOR, GEN PURP, SOT23 |
| W241061BLK | 24GA STR BLACK 7X32 300 V 80 C UL1061 |
| W241061RED | 24GA STR RED 7X32 300 V 80 C UL1061 |
| R0805050470 | 47 OHM, 5% RESISTOR, 0805 |
| R0805050222 | 2.2K OHM 5% SURFACE MNT 0805 SIZE T/R |
| DIO1N914SM | MMBD914, SMT SWITCHING DIODE SOT23 |
| TR14596A | MOSFET COMP, PAIR 30 V 3.7A SOIC8 |
| Custom membrane keypad | INNCO, SILICON ELASTOMERIC |
| Gear motor | SANYO, SA127NA4S |
| Panasonic | 0.047F CAP |
| (or Cooper | 0.1F CAP) |

It will be understood that the exact part numbers and manufacturers for components used in the exemplary circuit of FIG. 20 may be deviated from while nevertheless falling within the principles of the present invention. Most (or all) of the components are available from more than one manufacturer with full compatibility maintained. Moreover, it will be understood that the circuit design itself may be modified in many varied ways while still falling within the principles of the present invention.

Dual Mode Electronic Lock Box System

The mechanical operation of electronic lock box 10 provides for several important features. First, optimal operation is desired from a single motorized source to keep complexity and cost low, and this is achieved by the illustrated mechanical design. Second, when the illustrated mechanical design performs one of the latching operations, a latch re-engagement may occur when the lock box's main latching mechanism (e.g., its linear actuator) is already in its nominal "locked" state—in other words, when the linear actuator is already placed in its "locked" position, the key compartment door or the shackle may be returned from their "open" positions to their "closed" positions, and then they are retained in place (i.e., they become "locked") without any further movement by the linear actuator. Third, in the illustrated design, an audible and physical indication can be provided upon such re-engagement, which informs the user that the latching operation has been completed, and that the latching member now is secure. Fourth, in the illustrated mechanical design, the movements of the mechanical components may be precisely controlled, to ensure consistent operating results; this feature also allows lock box 10 to be constructed in a relatively small package.

The lock box of the present invention can also include a "protective system" that may prevent damage to the lock box's mechanical, electromechanical, and electronic systems in the event one of the latching mechanisms is physically jammed or frozen. Such protection is useful due to the relatively high operating currents of the motor and the relatively high torque generated by the motor gear train. As noted above, previous lock box designs have mainly focused on utilizing motor overcurrent protection via additional current sensing electronics, or by use of self-resetting fuses that activate when the motor's stall current creates enough heat to open a motor "heater" (i.e., an overcurrent protection thermal switch). These conventional designs increase parts count and add complexity to their design. In the present invention, "protection" control software is executed in the CPU 230 in conjunction with the CPU's integrated analog to digital converter 234 to monitor mechanism motion. If the motion of the linear actuator does not fit a predetermined pattern (e.g., an "expected pattern" within a particular range of tolerances) based on mechanism temperature and/or battery voltage, then operation of a mechanical movement can be halted to prevent irreversible damage to a component of lock box 10.

As another facet of operation, many conventional electronic lock boxes have typically utilized an "electronic key" to manage access to the secure compartment. In many instances, it may be desirable to incorporate lesser security measures when a smaller population of users may need access to the secure compartment 100. By intelligent use of such lesser security measures, the cost may be reduced, and also "broader" access to such an electronic lock box might be achieved for a more dynamic population of lock box users.

As noted above, one application of the electronic lock box technology of the present invention is for use as real estate electronic lock boxes. Typically, a real estate agent is a member of a larger population of agents that require access to the secure compartment 100 to retrieve a dwelling key. The members of this agent population may remain fairly constant, and when this is true, issuing an "electronic key" (or electronic identification card) is useful for the convenience of the agent and the security of the system. There are many instances, however, that a more random population of unaffiliated individuals will need access to the secure compartment 100 of a specific lock box 10. In the case of real estate sales, this "random" population may consist of home appraisers, repairmen, and others persons requiring transient access to the dwelling key in the secure compartment 100. Since this population changes frequently, it usually is not cost-effective or desirable to provide the fairly expensive conventional electronic keys or electronic identification cards to these individuals.

The present invention improves on the current state of the art by providing an electronic lock box system that can function both with and without a device similar to an electronic key. Such "dual mode" functionality is selectable by the "owner" of the lock box 10. The present invention may also incorporate a security feature in which the lock box's "security state" is automatically increased from a "lower state" to a "higher state" when the shackle 40 is released from the lock box 10. This arrangement can be used to ensure that the lock box's owner does not forget to re-enable the greater security protection of the higher security state. The "dual mode" security states are discussed below in greater detail, in connection with flow charts on FIGS. 23 and 24.

As described below, for flexible code usage the present invention in its lower security state also can be designed to incorporate a time-dependent security code, and also an optional "static" security code. Such codes preferably incorporate encrypted data such that the entered code includes unique identifying data that is logged in the lock box 10 for future interrogation by the lock box's owner. In one preferred mode of the present invention, the security code and identification information are interdependent, and therefore, the user of the code cannot practically forge a usable code (i.e., a person could not "steal" the identity of an authorized user in the long term, merely by having knowledge of that authorized user's correct access code—see the paragraph below).

Another feature of the present invention is related to expiration of access codes. As discussed above, most conventional card-based lock access control systems utilize an expiration date code resident on the card itself, and this date code is used to prevent access after that date has come and gone. However, the convention card-based lock access control systems can be defeated, as discussed above, even to the point of "illegal" electronic keys becoming "immortal," and never expiring when used with a conventional lockbox. The present invention cannot have its card expiring access codes altered to extend the card's life. This ensures that, if the card is lost or stolen, then the card can no longer be used after that expiration date, unless the expiration date data is updated. It also ensures that if the individual to whom the card is assigned is no longer an authorized user, access rights will expire after the predetermined date has passed.

The present invention described herein combines the convenience of a static user PIN (personal identification number) with encryption technology to create a method of card lifetime (or card expiration) that does not depend on an expiring calendar date. Further, when using the methodology of the present invention, unauthorized altering of the desired life of the identification card is extremely difficult and, even if achieved, it must be repeatedly performed on a regular basis to continue receiving access privileges. Moreover, when using the methodology of the present invention, the ability to create "immortal" access data is not possible. Finally, two distinct methods of data encoding are disclosed herein that accomplish the above card security and lifetime limitation features, although other methods could be used that also fall within the teachings of the present invention.

In both card lifetime/security methodologies described below, the secure system of the present invention utilizes highly precise electronic counters that facilitate independent synchronization of (1) a master counter residing on a (remote) clearinghouse computer (at a "central" location) and (2) counter circuits within the electronic lock box assemblies 10 (i.e., in the electronic lock boxes themselves). By using these counter circuits, both the clearinghouse computer and the electronic lock box assemblies 10 (such as a lock box used in a real estate environment) maintain a precise knowledge of the passage of time, substantially in lockstep.

When information is "exchanged" between the central clearinghouse computer 5 and an electronic lock box assembly 10, the exchange is performed in such a way that does not transfer actual calendar expiration data. Instead, PIN data is used, and the PIN data is diversified, based on the passage of distinct time units. The diversification of the PIN data affects the user's ability to enter correlating PIN data that is stored on some type of memory medium, such as a memory circuit on a portable memory card 12, or on a small portable computer card 12 (that also contains memory), such as an electronic "smart card." The result of this diversified PIN data is not predictable from one epoch count to the next epoch count, and thus the numeric value (the diversified PIN data) is "scrambled" in a manner that has no predetermined sequence.

Encryption Method

One methodology of the present invention uses encryption techniques to diversify the PIN information that is used to present data to the electronic lock box 10. Many types of encryption techniques could be used, and some techniques that may be suitable include any of a number of well known symmetric key encryption algorithms, such as DES or Blow Fish. When an encryption algorithm is selected by the system designer, that encryption algorithm is used to diversify the user's PIN on a "secure" memory device, such as a smart card 12. The "central" clearinghouse computer 5 chooses an encryption key based on a known counter value, which will be predetermined at a specific epoch time for the particular clearinghouse computer system. The user's PIN is thus diversified (or encrypted) by the clearinghouse computer 5, and the resulting diversified PIN bytes are stored on the smart card 12.

At a later time, the user will arrive at a physical location where an electronic lock box 10 is protecting a structure, such as a dwelling (e.g., in a real estate sales application). The user then inserts his or her smart card 12 into the access opening 50 of the lock box 10 to connect to the smart card reader contacts 52, and the electronic lock box 10 will read the diversified/encrypted PIN data (stored on the smart card 12) into a memory circuit in lock box 10. In the illustrated embodiment described above, the memory circuit is part of the CPU 230, which includes some on-board RAM (random access memory).

It will be understood that the "smart card" 12 (as it is commonly known) will contain some type of memory elements, and may also contain a processing device, such as a microprocessor or a microcomputer. The smart card 12 will also include some type of accessing or connection structure, such as a communications port or merely a set of electrical contacts (such as contacts that can interface to the smart card contact pads 52 of the lock box 10 on FIG. 10). It should be noted that some of the potential embodiments of the present invention do not always require the full capabilities of such a smart card 12, and a portable "memory card" could instead be utilized. Typically, such a portable memory card 12 would primarily comprise non-volatile memory elements, such as electrically erasable programmable read only memory (EEPROM), along with pin-outs that would allow access to those memory elements.

It will also be understood that, in some embodiments of the present invention, a "portable computer" may be used in conjunction with the above smart card 12, or the above portable memory card 12, as a "reader" of that card 12. Such a portable computer would typically contain a microcomputer and associated memory, a keypad, and a liquid crystal display (LCD) that communicates information to the user. The smart card/memory card 12 can be inserted into a receptacle of the portable computer to communicate various types of information to and from the portable computer. A typical portable computer for such use would not only contain non-volatile memory elements (such as EEPROM), but likely also some random access memory (RAM) that can be accessed by the smart card's on-board microcomputer. It should be noted, however, that the main embodiments disclosed in this patent document do not require the use of the portable computer to read the smart card 12 (or memory card 12). Instead, the smart card/memory card 12 is directly connected to the electronic lock box 10 via its reader port pads 52 (at opening) 50. For purposes of discussion herein, the terms "smart card" and "memory card" will be treated as having the same meaning, even though it is recognized by the inventors that a smart card may include much more functionality than a "bare bones" memory card. The memory elements of either a smart card or a memory card are utilized by the present invention, and the term "memory card" will typically be found in the claims of this patent document, while the term "smart card" will be found more often in the detailed description, mainly because the term "smart card" is an industry standard for this type of device. Both a smart card and a "bare bones" memory card will typically comprise a fairly small, portable device, approximately the size of a plastic credit card.

After the electronic lock box 10 reads the diversified/encrypted PIN data, the user enters his or her PIN on the integral keypad 222, and this entered PIN is also stored in the lock box's memory circuit. The computer program being executed by the CPU 230 now applies the appropriate encryption algorithm (e.g., a symmetric key encryption algorithm) to decrypt the PIN data retrieved from the smart card 12, utilizing the current counter value of the counter circuit in electronic lock box 10. (Note that, in the illustrated embodiment, the executed computer program is stored in ROM or EEPROM, which resides on-board the CPU 230. Moreover, the counter circuits discussed above also reside on-board the CPU 230; they can be "hard-wired" digital counters, or they can be registers that are included as part of the processing portion of the microcomputer itself.)

The entered PIN and the decrypted PIN are compared and, if they are equal, access to the secure compartment 100 is granted. When used in a preferred methodology of the present invention, the smart card 12 will be loaded with data that will be "good" for only a limited number of counts of epoch time. If the smart card 12 is presented to an electronic lock box within the prescribed number of counts of epoch time, then access should be granted (assuming the user enters the correct PIN). However, if the smart card 12 is not presented until after a "prolonged" amount of time, i.e., a time interval that will be outside the "window" of the originally-programmed amount of epoch time, then the counter value in lock box 10 will now have gone beyond the originally-contemplated count value range, and the decryption key used by the lock box 10 will be different from the encryption key used by the clearinghouse computer 5. (This is described below in greater detail.) In essence, because of the passage of time, the decrypted PIN bytes essentially will have become a random number that is unknown to the user, thereby severely limiting the user's ability to effect lock access.

It should be noted that a sufficiently large number of PIN digits should be utilized to ensure a low statistical probability of randomly convergent results. For example, four (4) PIN digits should be sufficient for "normal" security purposes (e.g., for real estate sales applications). If greater security is desired, then a larger number if PIN digits can be used for the lock box system, which will automatically increase the probability that random guesses will not be able to defeat the system and otherwise gain illicit access to the secure compartment 100.

Random Number Generator Method with Message Digest

A preferred embodiment of an epoch time counter and encryption system is now described, which is suitable for use with the present invention. The lock box system of the present invention uses a highly precise time counter (e.g., a digital counter that receives clock pulses from a very stable crystal clock oscillator) that counts to n count units, where n is the expiration period (in count values). Upon reaching n the counter resets to zero. The control software of the lock box 10 contains a message digest function and a pseudo-random cryptographic key generator, such as a random number generator algorithm. One such random number generator is the well-known linear congruential random number generator (LCG) algorithm. The description below will assume the LCG algorithm is being used in the present invention.

The lock system LCG is seeded and cycled to a known equivalent state at both the lock box 10 and the central clearinghouse computer 5. LCG pseudo random numbers are generated to create an encryption key j. This key j is not disclosed to the user and remains a shared secret between the lock box CPU 230 and the central clearinghouse computer 5. Key j is changed in lockstep by both the clearinghouse computer 5 and the lock box device 10, as epoch time passes while the counter circuits continue to increase (or increment) their count values.

The user creates a personal identification number (PIN) known only to that user. The central clearinghouse computer 5 processes the user's PIN with key j by seeding the message digest function with j, and digesting the data bytes that comprise the PIN, thus creating an digest result p. (For the purposes of the present invention, the well-known MD5 algorithm is suitable as the message digest function, and it will be assumed for this description that the MD5 algorithm is being used by the lock box system of this example.) The digest result value p is now stored on the identification card, which could be a portable memory card 12, or a portable computer card 12, such as a smart card 12. The "life" of p is expressed in terms of the interval of change of the key j. The value of p may be displayed or otherwise disclosed in plain text; however, if the value of p was not displayed (or disclosed), and instead was stored in a secure memory device, such as a standard smart card 12, then an additional layer of security would be added for tamper protection.

When the user arrives at an electronic lock box 10, the user inserts his or her identification card (e.g., a smart card 12) into the lock's access opening 50 to connect to the reader port 52 (i.e., the contact pads), thereby allowing the CPU 230 of the lock box device 10 to read the digest result p. The user then enters his or her PIN on the lock device's integral keypad 222. The CPU 230 of the lock device itself will now internally create a key k using the same pseudo random number algorithm that was earlier used by the central clearinghouse computer 5. The LCG seed is based on the lock's internal count of elapsed epoch intervals, and CPU 230 applies the message digest function to the user-entered PIN, thus creating a digest result q. The lock box device 10 next compares the value of p (which was read from the smart card 12) with the value of the digest result q. If p and q are equal, then access is granted to secure compartment 100.

In the event the user is unable to update his or her identification card 12 with a new encrypted value of p for the next expiration period, the message digest result q generated at the lock device 10 will not match the stored value of p, thereby rendering the user's PIN unable to gain entry to the secure area.

It should be noted that the number of digits in the keys j and k are also important to generating a sufficiently diversified number of digest results. If used properly, the likelihood of undesirable convergent results will become statistically unimportant.

Flow Charts Describing Control Logic

Figure 21:
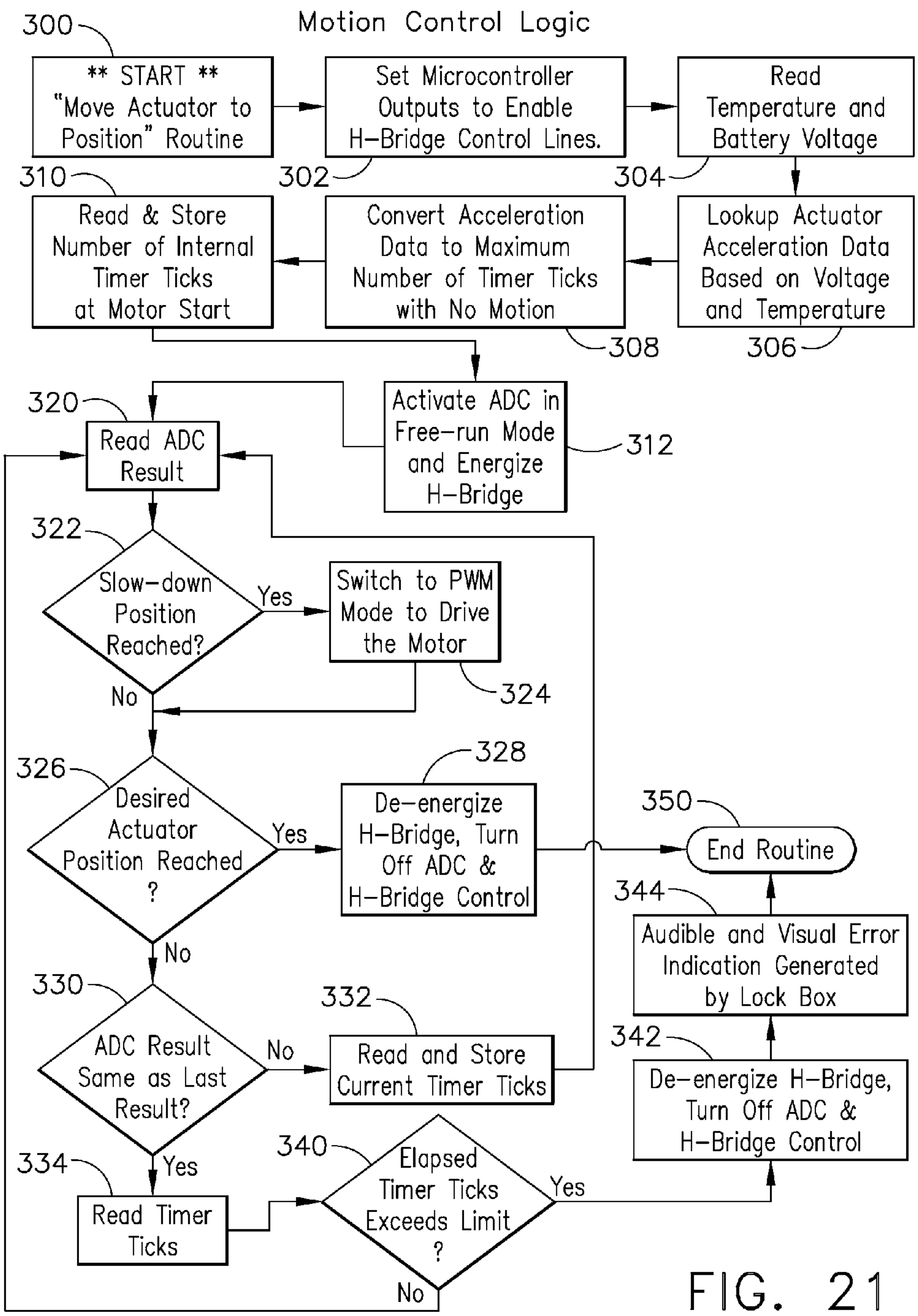
FIG. 21 is a flow chart illustrating some of the logical operations involved with moving the linear actuator of the electronic lock box of FIG. 1.

FIG. 21 provides a flow chart that illustrates some of the logical operations with regard to motion control of the motor and of the linear actuator of electronic lock box 10. This flow chart begins at a "start" step 300, which is the beginning of a routine referred to as the "Move Actuator to Position" routine. The first operational step in the routine sets the microcontroller outputs to enable the H-bridge control lines (at a step 302), which means that the FET transistors that drive the gear motor 200 can be energized. This H-bridge is referred to on FIG. 20 by the reference numeral 246.

A step 304 then reads the temperature and the battery voltage, using the temperature sensor 260 and a voltage sensing circuit that "measures" the battery voltage of battery 244. It this instance, the A/D converter (ADC) 234 performs a single-shot conversion (i.e., it does not need to perform continuous conversions). The next step is a step 306 that inspects a data table stored in memory that contains actuator acceleration data, and retrieves numeric values based on the actual voltage and temperature that were just determined in the previous step 304.

A step 308 now converts the acceleration data to the maximum number of "timer ticks" before motion would occur. The concept of "timer ticks" refers to a constant frequency clock that is built into the preferred microcontroller (i.e., the ATmega8 microcontroller manufactured by Atmel). In this microcontroller, the operating frequency of the crystal clock oscillator 272 is divided down to a frequency of thirty-two Hertz, which then provides timer ticks each having a duration of 1/32 seconds. The acceleration data that was looked up in step 306 is converted to a number of timer ticks having the 1/32 second duration. The number of timer ticks with "no motion" is a prediction of the expected number of 1/32 second timer ticks before the motor 200 would move a detectable extent. It will be understood that the concept of "timer ticks" (i.e., elapsed time values) could be implemented in many different ways without departing from the principles of the present invention.

A step 310 now reads and stores the number of internal timer ticks upon starting the motor. This would be the timer's count value (in "timer ticks") as of the command to start the motor. In one mode of the present invention, the count value for the timer tick value is a 5-bit number, having the values 0-31. This counter will roll over every second, when the counter runs at a frequency of 32 Hertz. This counter "count value" is the number that is stored at step 310 (also at a later step 332), when the timer ticks are read and then stored.

A step 312 now activates the analog-to-digital converter 234 (which is on-board the microcontroller 230 in the illustrated embodiment) to read the "position" input voltage (i.e., the voltage output by the potentiometer 190). Step 312 does so in a "free-run mode" (i.e., the A/D converter 234 provides a continuous stream of numeric conversions) and also energizes the H-bridge 246, which will electrically drive the motor 200.

A step 320 now reads the result of a conversion by the A/D converter 234, based on the present input voltage at the A/D converter's input 232. A decision step 322 now determines if a "slow-down" position of linear actuator 150 has been reached. If the answer is YES, then a step 324 switches the mode of driving the motor to a pulse-width mode (PWM), for driving motor 200. In this PWM mode, the motor can be driven at a speed other than its "full" speed.

On the other hand, if the slow-down position has not been reached, then the NO result at step 322 will be achieved, and the logic flow is directed to the next step at 326. The logic flow from step 324 is also directed to this next step 326. It will be understood that the use of a PWM mode versus a "full-speed" mode is not necessarily required when using the present invention—i.e., a "slow down" mode may not be needed.

Decision step 326 now determines if the desired actuator position has been reached. If the answer is YES, then a step 328 de-energizes the H-bridge 246, turns off the A/D converter 234, and also turns off the H-bridge control. When that occurs, the logic flow is directed to an "end routine" step at 350, and this particular motion control logic routine is finished. It should be noted that, in some lock box designs, it may be desirable to momentarily reverse the motor current upon reaching step 328, and then de-energizing the H-bridge 246. Such a procedure would more quickly halt the movement of the motor 200 and the linear actuator 150. On the other hand, such a procedure would also use more electrical energy, so it is not necessarily "better" to include the momentary current reversal; it is strictly an option.

However, if the actuator has not reached the desired position, then the logic flow is directed out the NO output from step 326 to a decision step 330, where it is determined if the result from the A/D converter 234 is the same as the most previous result. If that has occurred, then there may be a problem in the mechanical drive portion of the lock box 10.

If the A/D converter result was not the same as the previous result at step 330, then the logic flow is directed out the NO output to a step 332 where the current timer ticks value is read and stored, after which the logic flow is directed back to the step 320 where the next A/D converter result is taken. However, if the A/D result was the same as the previous A/D result at step 330, then the logic flow is directed out the YES result to a step 334 where the current value of the timer ticks is read. A step 340 now determines if the number of elapsed timer ticks has exceeded a predetermined limit. If the answer is NO, the logic flow is directed back to step 320, and the A/D converter result is again read. However, if the number of elapsed timer ticks has exceeded the predetermined limit, then the logic flow is directed out the YES result to a step 342, and the H-bridge is de-energized, the A/D converter 234 is turned OFF as well as the H-bridge control. An alarm is now generated, at a step 344. In the illustrated lock box 10, both an audible and a visual error indication is generated (since the actuator 150 is apparently "jammed" or otherwise malfunctioning), and then the logic flow is directed to the "end routine" step 350, and the motion control logic routine is now completed.

In step 342, the controller can optionally reverse the current through the motor 200 momentarily, in an attempt to unjam the linear actuator. As a further option, the controller could perhaps drive the linear actuator back to its locked position at step 342. In this optional mode, the linear actuator's position should still be monitored (using steps 320 through 340 again) to determine whether the actuator 150 is actually returning to its locked position. If it does not move at all (as determined by the ADC result at steps 320 and 330), then the controller should shut down the motor current, and not attempt further movement—while, of course, still generating the alarm result at step 344.

It will be understood that the executable software typically will be multitasking for the microcontroller 230, so that various other functions can be essentially performed simultaneously along with the motion control logic routine of the flow chart illustrated on FIG. 21. This allows the electronic lock box 10, e.g., to accept various inputs through the keypad 222, and also to keep track of other information, such as the elapsed time with regard to the timer ticks, while also displaying information on its display, or via its keypad LEDs.

Figure 22:
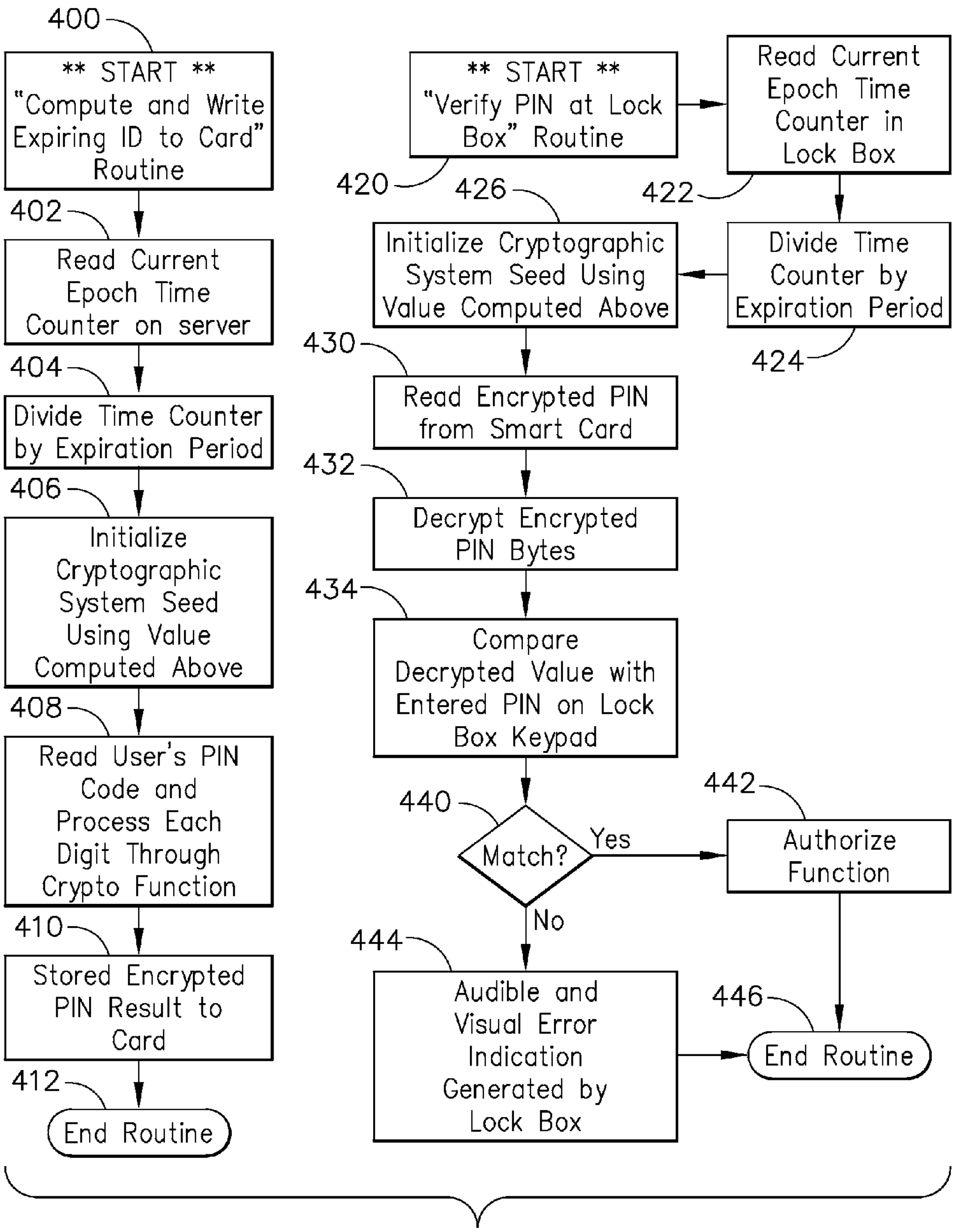
FIG. 22 is a flow chart illustrating some of the logical operations involved in the routines that store encrypted card expiration data, and later read such encrypted card expiration data along with PIN data, used to obtain access to the secure compartment of the electronic lock box of FIG. 1.

FIG. 22 provides two flow charts having to do with cryptographic card expiration routines. A step 400 starts a routine referred to as the "Compute and Write Expiring ID to Card" routine. The first operational step is a step 402 that reads the current epoch time counter on the server. This occurs at the central clearinghouse computer 5 (see FIG. 25), which would typically be connected to a network, and a network server thus would be executing this software routine. The next step is a step 404 that divides the epoch time counter value by an expiration period. The expiration period could be one day, one week, or one month, for example, or it could be set for other values, such as five days, or even a number of hours that would be less than one day. In general, a real estate agency would choose a value for its expiration period that is most convenient for its sales agents, and it would not be suitable in many cases for the expiration period to be less than one day, for example. In fact, in many agencies, it is likely that the expiration period selected would be more like one week or two weeks. In that case, each of the real estate agents could have their memory cards 12 (their "smart cards") updated by the central clearinghouse computer 5 on a less frequent basis (which normally would have to be done during each of the expiration periods), such as weekly, or monthly.

A step 406 now initializes the system's cryptographic seed using the value computed above. In one embodiment, this cryptographic system seed is the time counter value after it has been divided by the expiration period. When using this algorithm, the seed's numeric value will vary when the current epoch time window changes over to the next epoch time window (as per the time counter changing count values).

A real estate agent, as a typical "user," now presents his or her smart card 12 to a card reader station 6 that is connected to the central clearinghouse computer 5. This might (typically) take place within the office of the real estate agency. The user would also enter his or her personal identification code (PIN) on a keyboard or keypad, and this PIN code is now used to process each of the numeric digits of the seed value through a cryptographic function, which is some type of encryption function, as discussed above. A step 410 now stores the encrypted (or "diversified") PIN result to the user's smart card 12, and the logic flow is now directed to an "end routine" step 412, which finalizes this routine to compute and write the expiration information to the smart card 12.

Another flow chart on FIG. 22 starts at a step 420, for a routine referred to as the "Verify PIN at Lock Box" routine. The initial operational step in this routine is a step 422 that reads the current epoch time counter within an electronic lock box 10. This occurs when a user accesses the lock box, typically in an attempt to open the door 32 of the lock box to retrieve a mechanical key from the secure compartment 100.

A step 424 now divides the epoch time counter by the expiration period, and this expiration period would be the same throughout all the lock boxes of a particular real estate office or agency. In general, the expiration period at step 424 is the same as the expiration period that was discussed above at step 404.

A step 426 now initializes the cryptographic system seed using the value computed in step 424. In one embodiment, this cryptographic system seed is the time counter value after it has been divided by the expiration period. When using this algorithm, the seed's numeric value will vary when the current epoch time window changes over to the next epoch time window (as per the time counter changing count values).

As the user presents his or her smart card 12 to the electronic lock box 10 port (i.e., the smart-card connector contacts 52 inside the smart card connector opening 50), a step 430 will now read the encrypted PIN digits from the smart card 12 that has been presented. A step 432 now decrypts these encrypted PIN bytes, and a step 434 performs a comparison of numeric values. The first numeric value is the decrypted PIN bytes, and the second numeric value is the PIN data that is physically entered on the lock box's keypad 222, in which the user manually enters his or her PIN information. Step 434 compares the decrypted value (the first number) with the PIN data that has been entered on the lock box keypad 222 (the second number).

A decision step 440 determines if the two numeric values match. If the answer is YES, then a step 442 authorizes the requested function. Typically, this would be the request to open the door 32 to the key compartment 100, so the real estate agent can have access to the mechanical key inside the secure compartment. Once that has occurred, the logic flow travels to an "end routine" step 446, that finishes this verify PIN routine.

However, if there was no match at decision step 440, then the logic flow is directed to a step 444 that generates an audible and visual error indication, which is generated by the lock box itself. The logic flow is then directed to the end routine step 446. An audible and visual error indication can be generated by the lock box, via one of the LEDs 28 as well as the buzzer 270.

In the present invention, lock box 10 and clearinghouse computer 5 synchronize time counters and random number seeds upon the programming of the lock box. After each regularly occurring time interval, the lock box and clearinghouse computer each compute the next pseudo random number in the sequence. As both lock box 10 and clearinghouse computer 5 contain highly accurate timing means, the two devices generate equivalent codes at the nearly exactly the same moments in time.

The lock box CPU 230 evaluates a "temperature compensation time counter" (not shown in FIG. 20) to see if its value is one (1), which will occur at predetermined constant time intervals. If it is one (1), the CPU initiates a procedure to read temperature sensor 260 to determine the ambient lock box temperature. The CPU takes this temperature reading and initiates a lookup process of a compensation table (not shown in FIG. 20) located in lock box FLASH memory, and determines "fractional drift seconds," which can vary as the ambient temperature changes. This fractional drift seconds variable enables the lock box to keep track of the "time drift" (of the crystal oscillator) that is due to ambient temperature not always being a constant value. At each pertinent time interval, the "time drift" value is saved for time amounts that are less than one second. This "time drift" value is found the lookup table (i.e., the compensation table), and is added to the "accumulated drift," which is stored in RAM. CPU 230 next resets a "temperature read counter" (not shown in FIG. 20).

CPU 230 then computes whether the accumulated drift is greater than or equal to one second. If so, then the CPU subtracts one second from a "progressive code regeneration time counter" (not shown in FIG. 20) and also subtracts one full second from the accumulated drift value. The remainder of any fractional drift is left in the accumulated drift value. This series of temperature compensation steps ensures close synchronization with the central clearinghouse computer 5 generation of progressive access codes, when using a crystal clock oscillator that is not internally compensated for temperature variations.

Figure 23:
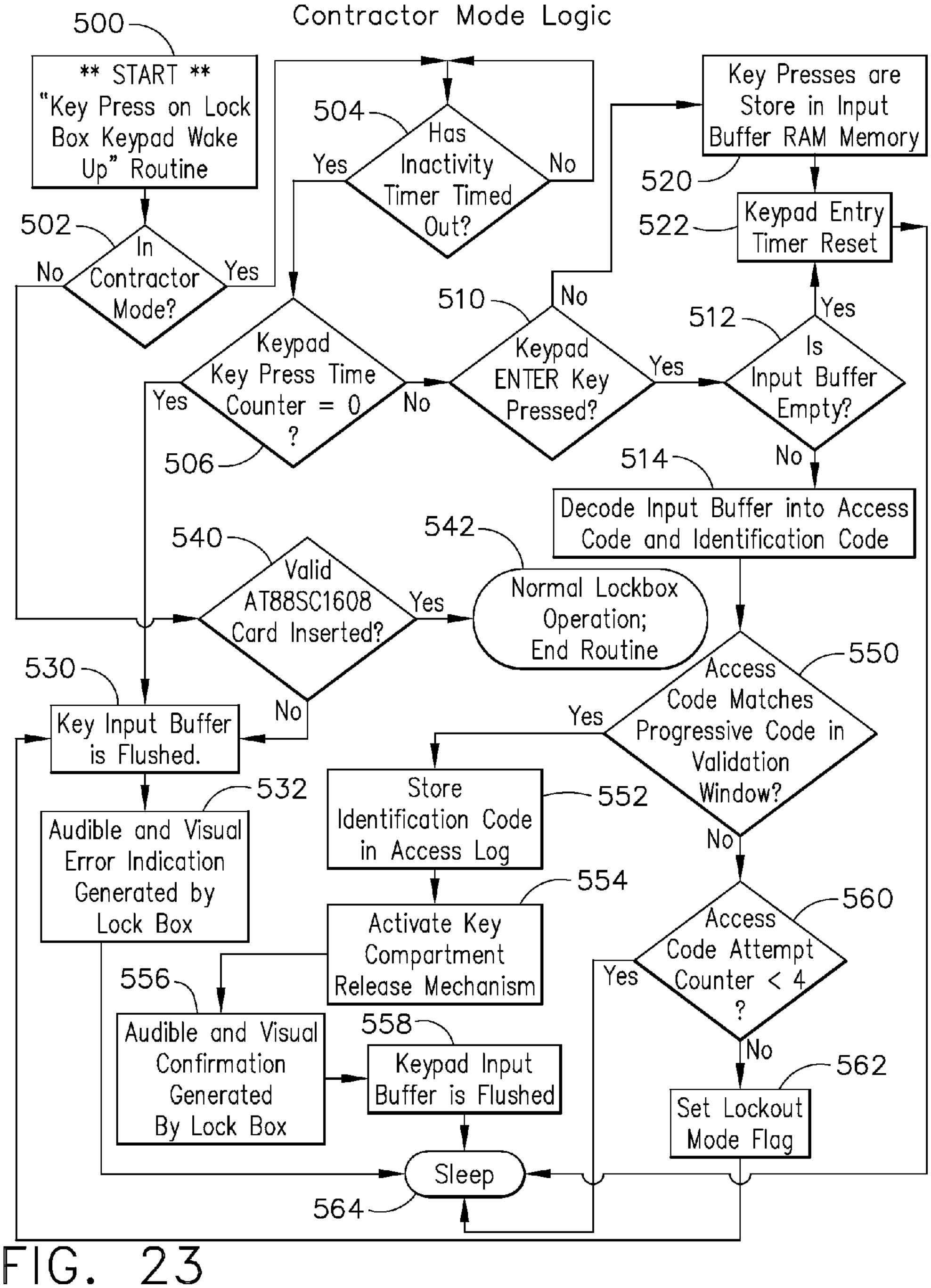
FIG. 23 is a flow chart illustrating some of the logical operations involved with a "contractor mode" alternative routine for allowing access to the secure compartment of the electronic lock box of FIG. 1.

FIG. 23 provides a flow chart having to do with a "contractor mode" of operation. In this contractor mode, there is no smart card (or any type of memory card) presented to the electronic lock box 10. Instead, the contractor (e.g., a plumber or an electrician) is given a numeric access code, and this access code is entered via the keypad 222. Of course, a "correct" access code must nevertheless be entered, or the lock box 10 will not allow the key compartment door to be opened. Since no smart card is used to access the key compartment 100, the lock box 10 must be placed into a comparatively lower security state when the "contractor mode" is in effect. The other typical mode of operation (i.e., when the user must present a smart card 12 at the card reader port 52 to gain access to the key compartment 100) uses a relatively higher security state, by virtue of the need for a physical smart card 12 to be available to operate the lock box 10.

In one mode of the present invention, the "owning agent" of the lock box 10 must cause lock box 10 to enter the lower security state, by enabling the contractor mode in advance (as a special function, that only the owning agent can perform). Once this contractor mode has been enabled, the lock box will expect keypad entries to occur without a smart card inserted into the reader port 52, and the lock box will treat this situation as being in the contractor mode. At the same time, the lock box's "normal" key access functions can still be allowed using the higher security protocols, if the owning agent desires (i.e., when an agent uses a smart card 12 to open the key compartment). Alternatively, the owning agent can disable such "normal" access functions, if desired, while the lock box 10 is in the contractor mode. In other words, the lock box 10 could be set up to operate in its lower security state (i.e., the contractor mode) while not allowing certain functions that typically take place only in its higher security state. In general, the owning agent should always be able to control all functions of the lock box 10, regardless of the current security state of the lock box.

In the flow chart of FIG. 23, there is also logic presented that concerns a situation in which a smart card 12 has been inserted in the smart card reader port 52 at the opening 50, however, the smart card 12 may turn out to not be valid. Control logic for this situation is described below, although by itself, it is not part of the mainstream logic for the contractor mode. It is depicted on FIG. 23 for explanatory purposes.

Starting at a step 500, this routine is referred to as a "Key Press on Lock Box Keypad Wake Up" routine. The initial operational step is a decision step 502 which determines whether or not the system is in the "contractor mode" of operation. If the answer is NO, then the logic flow is directed to a decision step 540 that determines whether or not a valid AT88SC1608 card has been inserted.

If the answer at step 540 is YES, then the lock box will enter its normal operational routines at a step 542, and that is the end of this branch of the routine that is illustrated on FIG. 23. Other "standard" routines will then be executed, some of which are described in various other places in this patent document, or in other patent documents that are incorporated herein by reference, as noted below.

If a valid AT88SC1608 card has not been inserted, then the NO result will be achieved at step 540, and the keypad input buffer will be flushed at a step 530. The next thing to occur is at a step 532, in which an audible and visual error indication is generated by the lock box. This would typically involve one of the LEDs 28 and the buzzer 270. After that has occurred, the logic flow is directed to a "Sleep" step 564, which is the end of this branch of the routine on FIG. 23. As discussed above, the operating software of the microcontroller 230 would typically be multitasking, and other routines could be operating, essentially simultaneously in real time with these routines. The "Sleep" mode is only temporary, and the electronic lock box 10 will be activated upon predetermined time intervals, such as once every second, to determine whether or not any further software routines need to be executed. Many of these routines have been described in previously-filed patent applications by the same inventor, and these applications are incorporated by reference herein, in their entirety. These patent applications describe similar electronic lock box systems, and are commonly-assigned United States patent applications as follows: "ELECTRONIC LOCK SYSTEM AND METHOD FOR ITS USE," filed on Jun. 14, 2002, having the Ser. No. 10/172,316; and "ELECTRONIC LOCK SYSTEM AND METHOD FOR ITS USE WITH CARD ONLY MODE," filed on Oct. 9, 2002, having the Ser. No. 10/267,174.

If the lock box is in the contractor mode, then the result at decision step 502 would be YES, and the logic flow is then directed to a decision step 504 that determines if the "Inactivity Timer" has timed out. If the answer is NO, then the logic flow is directed back to the "top" of step 504, in a continuous do-loop (except for other multitasking functions) until the inactivity timer finally does time out. Once the inactivity timer has timed out, the logic flow travels out the YES result to a decision step 506. At step 506, it is determined whether or not the keypad key press time counter is now equal to zero (0). A reading of zero at this step indicates that it is time to flush the key input buffer, and the logic flow is directed to step 530, and the key input buffer is flushed. Step 532 will then generate an audible and visual error indication, and the lock box will go back into its sleep mode at step 564.

If the keypad's key press time counter is not equal to zero (0), then the logic flow travels from step 506 through its NO output to a decision step 510 that determines if the keypad's ENTER key has been pressed. If the answer is NO, then the logic flow travels to a step 520 that stores the values of the previous key presses in an input buffer within the lock box's RAM memory. Typically, the RAM is on-board the microcontroller 230 (although that is not necessary). A step 522 now resets the keypad entry timer. Once this has occurred, the logic flow is directed to the sleep step 564, and this routine is finished for now.

At step 510, if the ENTER key has been pressed on the keypad 222, then the logic flow is directed out the YES result to a decision step 512. If the input buffer is empty, then the keypad entry timer is reset at step 522, and the controller enters the sleep mode at step 564. However, if the input buffer is not empty at step 512, then the logic flow is directed to a step 514 that decodes the input buffer into "access code" information and "identification code" information. In the contractor mode of this embodiment, the "access code" information is typically a static code that is decided by the owning agent of the electronic lock box 10. In other words, the numeric value of the "static" access code remains at a particular numeric value until it is reprogrammed by the owning agent. There is no identification information associated with this static code.

However, there is some type of identification information required when using the contractor mode. This is referred to as the "identification code" that, in one embodiment, is a one-day code that is generated by the central clearinghouse computer 5. This is a more dynamic code, since it changes on a daily basis in this embodiment. The identification code can be given to a contractor (such as a plumber or electrician), and that code will be entered by the contractor on the keypad 222 when he or she attempts to access the lock box's secure compartment 100. If desired, there can be more than a single identification code that can be used on the same day. For example, if the clearinghouse computer 5 provided four different identification codes, then four different contractors could access a particular lock box 10 on the same day. In one embodiment, the static access code could be the same for all four contractors, however, each would have a different identification code. In this manner, the electronic lock box 10 will be able to determine exactly who accessed the secure compartment. This information, of course, can be placed into a log of such accessing information.

It will be understood that the "daily" basis for the identification codes used in the contractor mode is readily changed to a different time period, without departing from the principles of the present invention. Any time period could be used, if a single day is not considered the "best" way to govern this type of user function. In addition, it will be understood that the "static" property of the "access code" information need not truly be static. The lock box control system could be readily adjusted to cause the access code to expire after a predetermined amount of elapsed time, which would then require the lock box owner to enter a new access code upon the occurrence of the next corresponding time period. Such time periods would not necessarily have anything to do with the "epoch time" intervals, discussed above.

A decision step 550 now determines if the access code matches a "progressive code" within the "validation window." In other words, the access and identification codes must match up to a particular validation time window, which would be for a single day if the system is used in the manner described in the paragraph above. Therefore, if a contractor has been given an identification access code that would be valid on a Wednesday, then that same access code would not be valid in a different "validation window," such as on Tuesday or on Thursday.

If the result at step 550 is that the access code does match, then the logic flow travels out the YES output to a step 552, which stores the identification code that was submitted in the lock box's "access log." A step 554 now activates the key compartment release mechanism, and the key compartment door 32 opens to allow access to the secure compartment 100. If desired, an audible and visual confirmation can be generated by the lock box at a step 556. The next step flushes the keypad input buffer, at a step 558. This is the final operational step before reaching the sleep step 564, which finishes this branch of the contractor mode routine.

After a contractor has obtained access to the key compartment of lock box 10, the contractor's ID code information will be stored in the lock box's access log that can be retrieved by the lock box's owner at a later time. The owner would present his or her smart card 12 at the card reader port 52, and enter the proper commands to have the access log uploaded from the log box's memory into the memory on the smart card 12. Still later, the owner can download this access log information to the central clearinghouse computer 5, and it will be simple to track exactly who entered the lock box, and when. If desired, the lock box system optionally could be set up so as to allow other authorized users to upload the access log onto their smart cards.

If, however, the access code does not match the progressive code within the proper validation window at step 550, then the logic flow travels out the NO result to a decision step 560, which determines whether or not an "access code attempt counter" is less than a predetermined numeric value, such as the number four (4). If the answer is YES, then the logic flow travels to the sleep step 564, and the contractor will have another chance of entering his or her access code. However, if the access code attempt counter is not less than this predetermined number (such as four), then the logic flow travels out the NO output to a step 562 that sets a lockout mode flag. When this occurs, the keypad input buffer is flushed at step 530, and an audible and visual error alarm is generated by the lock box at step 532. The lock box then enters its sleep mode at step 564, and this routine is finished for now.

Figure 24:
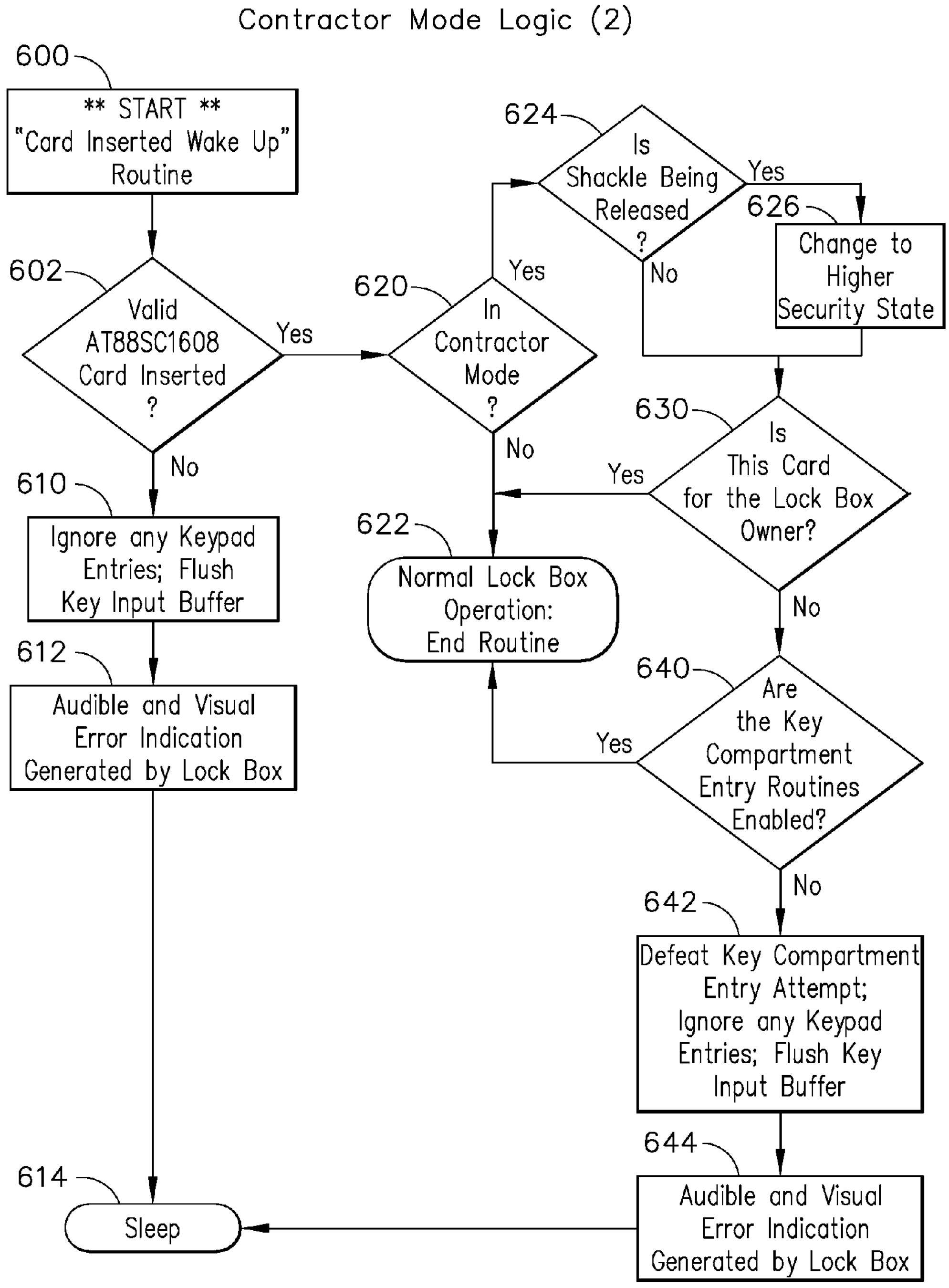
FIG. 24 is a flow chart illustrating some of the logical operations involved with a "Card Insert Wake Up" routine, used with the electronic lock box of FIG. 1.

Referring now to FIG. 24, another set of flow chart steps are illustrated that depict some of the logical operations that take place in other portions of the lock box software logic. As noted above, when in the contractor mode, the person attempting to enter information on the lock box keypad 222 would typically not be using a memory card or smart card 12 at all. However, a different person may come to this same electronic lock box 10 and insert his or her smart card 12 into the card reader port 52. In that situation, the lock box 10 must know how to respond.

On FIG. 24, a "Card Inserted Wake Up" routine is started at a step 600. This routine is called when a memory card/smart card 12 is inserted into the card reader port 52 of the lock box 10, whether in the "contractor mode" or not. A decision step 602 determines if a valid AT88SC1608 card has been inserted. If not, the logic is directed to a step 610 that ignores any keypad entries, and flushes the key input buffer. A step 612 then provides an audible and visual error indication that is generated by lock box 10, and the lock box enters a sleep mode at a step 614. That is the end of this routine, which didn't last very long since a non-valid card had been inserted in the port 52.

On the other hand, if a valid smart card 12 has been inserted into the port 52, then the logic is directed out the YES output of step 602 to a decision step 620, in which the lock box determines whether or not it is currently in the "contractor mode." As described above, the contractor mode is a special function that is controlled by the "owner" of the particular lock box, and once in that mode the lock box will respond to persons (e.g., contractors) entering a proper code at the keypad 222, even though a smart card 12 was not presented to the reader port 52.

If the lock box 10 is presently in the contractor mode, then the logic flow is directed to a decision step 624 that determines whether the lock box operation now being requested by the user is a "shackle release" function. If so, then the security state is altered at a step 626 to the higher security state, and hence the lock box is no longer in the "contractor mode" of operation (which is the lower security state). The logic flow then continues in the higher security state to a decision step 630 that determines if the smart card 12 that has been presented to the reader port 52 is the actual card for the lock box owner, or the smart card of one of the owner's "team members," who are other persons granted owner privileges for this particular lock box. If the answer is YES, then the logic flow is directed to a step 622, which enables "normal" lock box operation; and that is the end of this particular routine.

Of course, other routines will also be enabled for the lock box owner (or team members), however, those routines are not described on this flow chart of FIG. 24. As discussed above, there have been previous patent applications filed that are commonly assigned to SentriLock, Inc., which describe many other types of lock box functions that can be executed upon command by the lock box owner. Moreover, other functions that can be executed by the lock box owner are described herein, in other portions of this patent document. It will be understood that, if the lock box software is designed to allow "team members" to be granted the same privileges of the actual lock box owner, then most or all references herein to functions that can be performed by the owner will also be capable of being performed by one of the owner's team members.

The lock box control software will typically be capable of determining exactly which smart card is the owner's card, either by inspecting the serial number of the card, or by receiving a special code that is entered via the keypad, in which such special code is supposed to be known solely by the owner. In a similar manner, the lock box control software will typically be capable of determining exactly which smart cards are the team members' cards, either by inspecting the serial number of the inserted card, or by receiving a special code that is entered via the keypad, in which such special code is supposed to be known solely by the correct team members (or, for example, by using a combination of both pieces of information).

If the particular smart card 12 that has been presented to the card reader port 52 is not that of the lock box owner (or a team member), then the logic flow from decision step 630 will flow out the NO result to a decision step 640. In step 640, it is determined whether the key compartment entry routines for this particular lock box 10 have been enabled, or instead have been disabled by the lock box owner when he or she placed this particular lock box 10 into the contractor mode. If the "normal" key compartment entry routines have been enabled, then the logic flow travels out the YES result to step 622, which allows normal lock box operation; and that is the end of this particular routine on FIG. 24.

On the other hand, if the key compartment entry routines have not been enabled, then the logic flow is directed to a step 642 that essentially defeats any key compartment entry attempt by this particular user. Keypad entries will be ignored, and the key input buffer will be flushed at this step 642. A step 644 now causes an audible and visual error indication to be generated by the lock box 10, and the lock box will then enter its sleep mode at a step 614.

It will be understood that the lock box control software could be written in a manner such that some of the functions described herein may be performed in a different order than depicted on the flow chart. For example, step 630 which determines if the inserted card is the owner's card could perhaps be performed before step 624, which determines if the requested operation is a shackle release function. Any such changes in the order of these logic steps can almost always be possible by quite simple changes to the software coding, and such variations are well within the principles of the present invention, especially as such variations are easily contemplated by the a person of ordinary skill in the art of control logic.

If decision step 620 determines that this particular lock box 10 is not in the contractor mode, then the logic flow will travel out the NO result to step 622, which will enable normal lock box operation, and that is the end of this routine on FIG. 24. In that situation, the other functions that can be executed by a user with a smart card 12 will be accessible by a proper user with a proper set of access or other types of code information that can be entered on the keypad 222. This includes functions that are not described in this patent document, but are described in other patent applications that have been previously filed by the same inventor and are commonly assigned to SentriLock, Inc., as noted above.

Figure 25:
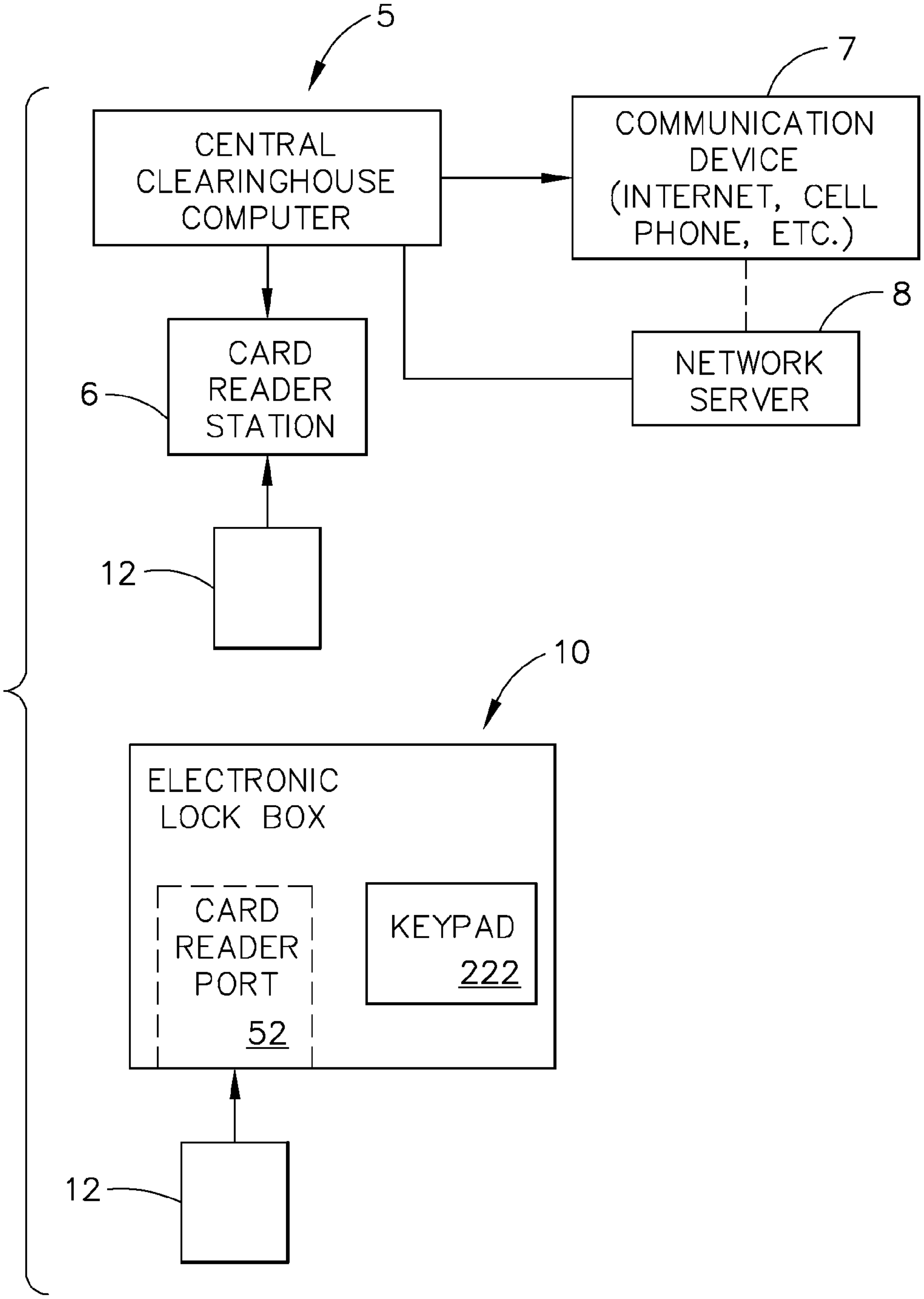
FIG. 25 is a general block diagram of an electronic lock box system that would include the electronic lock box of FIG. 1.

Referring now to FIG. 25, a general block diagram of an electronic lock box system is provided. A central clearinghouse computer is illustrated, as generally designated by the reference numeral 5. A card reader station 6 is connected to the clearinghouse computer 5, and it is this card reader station 6 that is used for programming smart cards (or memory cards) 12, for use by agents in a real estate agency, for example. It is the use of these smart cards 12 that enables many lock box functions at the remote locations where the lock boxes themselves will be positioned.

The central clearinghouse computer would typically also be connected to some type of communication device, generally designated by the reference numeral 7. This can include a connection to the Internet, or it can include connections to telephone systems, such as cell phone towers or to other land-line telephone communications networks. Moreover, the clearinghouse computer 5 would typically be connected to a computer network of its own, which could include an internal computer network within the real estate office, or perhaps connected through some type of communication device, such as the device 7. Moreover, this "internal" network would typically be serviced by a network server 8.

FIG. 25 also illustrates a general block diagram of an electronic lock box 10. As described above, lock box 10 would include a keypad 222 for use in making manual data entries, and also a card reader port 52, for use in receiving memory cards or smart cards. A "standard" smart card 12 is depicted on FIG. 25 as being presented to the card reader port 52. The smart card or memory card 12 is the same device that is also programmed by the card reader station 6 at the clearinghouse computer 5. It will be understood that other data already stored on the smart card/memory card 12 could be also read by the card reader station 6, and this could be information (such as log access data) that a user or the owner of a lock box wishes to have downloaded from the card 12 to the central clearinghouse computer 5.

It will also be understood that the logical operations described in relation to the flow charts of FIGS. 21-24 can be implemented using sequential logic, such as by using microprocessor technology, or using a logic state machine, or perhaps by discrete logic; it even could be implemented using parallel processors. One preferred embodiment may use a microprocessor or microcontroller (e.g., microcomputer 230) to execute software instructions that are stored in memory cells within an ASIC. In fact, the entire microprocessor or microcontroller (or perhaps even microcomputer 230, for that matter) along with dynamic RAM and executable ROM may be contained within a single ASIC, in a one mode of the present invention. Of course, other types of electronic circuitry could be used to implement these logical operations depicted in the drawings without departing from the principles of the present invention.

It will be further understood that the precise logical operations depicted in the flow charts of FIGS. 21-24, and discussed above, could be somewhat modified to perform similar, although not exact, functions without departing from the principles of the present invention. The exact nature of some of the decision steps and other commands in these flow charts are directed toward specific future models of electronic lock box systems (those involving REALTOR® lock boxes, for example) and certainly similar, but somewhat different, steps would be taken for use with other types of lock box systems in many instances, with the overall inventive results being the same.

It will be still further understood that the references to a portable "memory card," or to a "smart card," are made merely as examples of preferred devices that contain memory storage circuits that can be read by a computing apparatus. The form of such a portable memory card usable with the present invention can be of virtually any physical shape (i.e., not necessarily as a flat "card"), and can contain virtually any type of memory elements, such as semiconductors, magnetic core elements, bubble memory, read/write optical-readable devices, or even three-dimensional optical memory in the future. Such memory devices can mainly comprise non-volatile memory elements, such as Flash memory; they can also contain a processing device "on-board" the "card" (or other shaped device). Example memory devices in this category are data keys (including the DATAKEY®, made by Data Key, Inc. of Minneapolis, Minn.), and USB-compatible portable memory devices, such as those manufactured by Lexar of Fremont, Calif., SanDisk of Sunnyvale, Calif., or Rainbow Technologies of Irvine, Calif. In general, the "smart card" used in the present invention may comprise any portable memory device that has some type of "connecting mechanism" that allows it to interface to a separate computer, whether via physical contact or otherwise. Moreover, the references herein to a "card reader," such as the reader station 6 or reader port 52 on FIG. 25, are directed to an appropriate interface device that is capable of communicating with the specific memory device that would be used with the present invention. As such, the card reader is a "device reader." For example, if the memory device is a data key (such as one made by Data Key, Inc.), then the "card reader" would actually be a data key reader.

All documents cited in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. An electronic lock box apparatus, comprising:

an electrical power source, a controller circuit, a memory circuit, a precise time counter, a secure compartment having an actuatable access member, a manual data entry apparatus, and a device read/write port; and a separate portable memory device that exchanges data with said device read/write port, said portable memory device containing a plurality of alterable memory elements that store a data value P;

wherein, said controller circuit is configured:

(a) to read said data value P that is stored on said portable memory device;

(b) to calculate, using a predetermined message digest function, an encryption key value K, wherein said predetermined message digest function is seeded with an initial value J that is based on a current value T of said precise time counter, and wherein said encryption key value K changes as said value T of said precise time counter changes;

(c) to receive a user-determined code C that is entered at said manual entry apparatus;

(d) to process, said predetermined message digest function, said user-determined code C, and said encryption key value K, to generate a message digest result Q;

(e) to compare said data value P to said message digest result Q, and if P=Q, then to grant access to said secure compartment by actuating said access member;

(f) said message digest result P changes state when said current value T of said precise time counter reaches a predetermined value U2 that is sufficiently different in numeric units from an earlier value U1 of said current value T of said precise time counter; and (g) said user enters a user-selected value C2 at a central computer apparatus during a first epoch time interval to be processed and to generate a message digest result P1 that is stored on said portable memory device as said data value P, and then presents said portable memory device to said electronic lock box apparatus during a second epoch time interval and enter said user-determined code C at said manual entry apparatus, and if C=C2, then:

(i) if said portable memory device was most previously updated by said central computer apparatus with said data value P during said second epoch time interval, then said data value P will be equal to said message digest result Q and said access to said secure compartment will be granted by said electronic lock box apparatus; and (ii) if said portable memory device was most previously updated by said central computer apparatus with said data value P during a moment other than said second epoch time interval, then said data value P will not be equal to said message digest result Q and said access to said secure compartment will not be granted by said electronic lock box apparatus.

2. The electronic lock box apparatus of claim 1, wherein: said precise time counter produces an output value in units of epoch time, not calendar time.

3. The electronic lock box apparatus of claim 1, wherein: a pseudo random number algorithm is used in generating said encryption key value K.

4. The electronic lock box apparatus of claim 1, wherein said manual data entry apparatus comprises a keypad mounted on said electronic lock box apparatus.

5. The electronic lock box apparatus of claim 1, wherein said portable memory device comprises one of: (a) a smart card; (b) a data key, and (c) a USB-compatible memory device.

6. The electronic lock box apparatus of claim 1, wherein said controller circuit is further configured to allow an owner of said electronic lock box apparatus to set up an optional operating mode for the electronic lock box apparatus, such that the electronic lock box apparatus:

(a) is placed into a lower security state, and (b) the electronic lock box apparatus then allows access to the secure compartment without using said portable memory device if a user enters a predetermined contractor code on said manual data entry apparatus.

7. The electronic lock box apparatus of claim 6, wherein, the predetermined contractor code is a single-use code.

8. The electronic lock box apparatus of claim 1, wherein said electrical power source comprises a battery to allow said electronic lock box apparatus to be used in outdoor environments without requiring an external power supply.

9. An electronic lock box system, comprising:

(a) at least one portable memory device that contains a plurality of alterable memory elements for storing data;

(b) a central computer apparatus, including: a processing circuit, a first memory circuit, a first precise time counter, and a communications circuit that exchanges data with a manually-operated data entry device and with a first device read/write port;

said processing circuit is configured:

(i) to calculate, using a first predetermined message digest function, an encryption key value K1, wherein said first predetermined message digest function is seeded with an initial value J1 that is based on a current value T1 of said first precise time counter, and wherein said encryption key value K1 changes as said value T1 of said first precise time counter changes;

(ii) to receive a user-selected value C1, by way of said manually-operated data entry device;

(iii) to process said first predetermined message digest function, said user-selected value C1, and said encryption key value K1, to generate a message digest result P; and (iv) to store said message digest result P on said at least one portable memory device by way of said first device read/write port; and (c) at least one electronic lock box apparatus, including: an electrical power source, a controller circuit, a second memory circuit, a second precise time counter, a secure compartment having an actuatable access member, a manual data entry apparatus, and a second device read/write port; and wherein, said controller circuit is configured:

(i) to read said data value P that is stored on said at least one portable memory device by way of said second device read/write port;

(ii) to calculate, using a second predetermined message digest function, an encryption key value K2, wherein said second predetermined message digest function is seeded with an initial value J2 that is based on a current value T2 of said second precise time counter, and wherein said encryption key value K2 changes as said value T2 of said second precise time counter changes;

(iii) to receive a user-determined code C2 that is entered at said manual entry apparatus;

(iv) to process said second predetermined message digest function, said user-determined code C2, and said encryption key value K2, to generate a message digest result Q; and (v) to compare said data value P to said message digest result Q, and if P=Q, then to grant access to said secure compartment by actuating said access member, wherein said message digest result P changes state when said current value T1 of said precise time counter reaches a predetermined value U2 that is sufficiently different in numeric units from an earlier value U1 of said current value T1 of said precise time counter, wherein said user enters said user-selected value C1 at said manually-operated data entry device during a first epoch time interval, and presents said at least one portable memory device to said at least one electronic lock box apparatus during a second epoch time interval and enter said user-determined code C2 at said manual entry apparatus, and if C1=C2, then:

(a) if said at least one portable memory device was most previously updated by said central computer apparatus with said data value P during said second epoch time interval, then said data value P will be equal to said message digest result Q and said access to said secure compartment will be granted by said at least one electronic lock box apparatus; and (b) if said at least one portable memory device was most previously updated by said central computer apparatus with said data value P during a moment other than said second epoch time interval, then said data value P will not be equal to said message digest result Q and said access to said secure compartment will not be granted by said at least one electronic lock box apparatus.

10. The electronic lock box system of claim 9, wherein:

(a) said first predetermined message digest function at said central computer apparatus is identical to said second predetermined message digest function at said at least one electronic lock box apparatus; and (b) if said current value T1 of said first precise time counter is equal to said current value T2 of said second precise time counter at the instant said at least one portable memory device is presented to said at least one electronic lock box apparatus, then initial value J1 will be equal to said initial value J2, and said encryption key value K1 will be equal to said encryption key value K2.

11. The electronic lock box system of claim 10, wherein: if said user-selected value C1 is equal to said user-determined code C2, then P will be equal to Q.

12. The electronic lock box system of claim 10, wherein: if said user-selected value C1 is not equal to said user-determined code C2, then P will not be equal to Q even if said encryption key value K1 is equal to said encryption key value K2, and access to said secure compartment will not be granted.

* * * * *